(12) United States Patent
Kapala et al.

(10) Patent No.: US 10,915,372 B1
(45) Date of Patent: Feb. 9, 2021

(54) SYSTEMS AND METHODS FOR VIRTUAL MACHINE RESOURCE OPTIMIZATION USING TREE TRAVERSAL TECHNIQUES REPRESENTING ALTERNATE CONFIGURATIONS

(71) Applicant: Verizon Patent and Licensing Inc., Arlington, VA (US)

(72) Inventors: Matthew Kapala, North Billerica, MA (US); Hector A. Garcia Crespo, Waltham, MA (US); Sudha Subramaniam, Westborough, MA (US); Brian A. Ward, Fort Worth, TX (US); Brent D. Segner, Hilliard, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/787,989

(22) Filed: Feb. 11, 2020

(51) Int. Cl.
  *G06F 9/50* (2006.01)
  *G06N 20/00* (2019.01)

(52) U.S. Cl.
  CPC .......... *G06F 9/5077* (2013.01); *G06N 20/00* (2019.01)

(58) Field of Classification Search
  CPC .................................................. G06F 9/5077
  See application file for complete search history.

(56) References Cited

U.S. PATENT DOCUMENTS

2013/0185039 A1* 7/2013 Tesauro ............... G06F 17/11 703/6
2015/0347649 A1* 12/2015 Shiraki ............... G06F 30/20 703/2

OTHER PUBLICATIONS

R. Roy, "ML—Monte Carlo Tree Search (MCTS)," Geeks for Geeks, (available at https://www.geeksforgeeks.org/ml-monte-carlo-tree-search-mcts/, visited Feb. 10, 2020).
A. Prengere et al., "MCTS—mcts.py," GitHub, (available at https://github.com/pbsinclair42/MCTS/blob/master/mcts.py, visited Feb. 10, 2020).
P. Sinclair, "mcts 1.0.4—pip install mcts," Python Software Foundation, (available at https://pypi.org/project/mcts/, visited Feb. 10, 2020).

* cited by examiner

*Primary Examiner* — Sisley N Kim

(57) ABSTRACT

Systems described herein may allow for the intelligent configuration of containers onto virtualized resources. Different configurations may be generated based on the simulation of alternate placements of containers onto nodes, where the placement of a particular container onto a particular node may serve as a root for several branches which may themselves simulate the placement of additional containers on the node (in addition to the container(s) indicated in the root). Once a set of configurations are generated, a particular configuration may be selected according to determined selection parameters and/or intelligent selection techniques.

20 Claims, 18 Drawing Sheets

US 10,915,372 B1

SYSTEMS AND METHODS FOR VIRTUAL MACHINE RESOURCE OPTIMIZATION USING TREE TRAVERSAL TECHNIQUES REPRESENTING ALTERNATE CONFIGURATIONS

BACKGROUND

Containers, which may include operating systems, applications, etc., may be installed on "bare metal" machines and/or virtual machines ("VMs"), in a virtual cloud platform, for example, which may include discrete sets of hardware resources of one or more hardware machines. A particular set of hardware resources (whether referring to a "bare metal" machine or to a virtual machine) may be referred to as a "node." Nodes in virtualized environments may be provisioned with varying sets of hardware (e.g., varying amounts of processor resources, memory resources, storage resources, etc.). Further, different containers may use, and/or may require, varying amounts of hardware resources.

DETAILED DESCRIPTION OF THE PREFERRED EMBODIMENTS

Figure 1A:
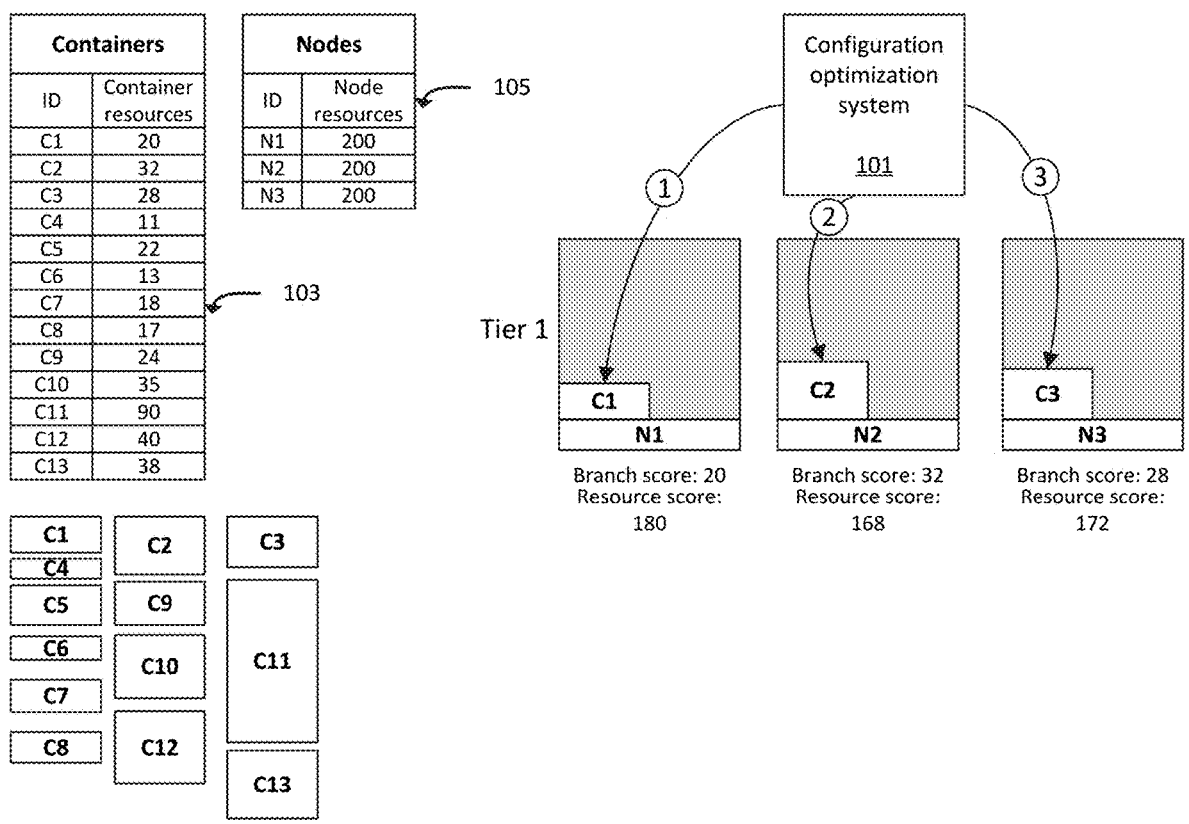
FIGS. 1A-1H illustrate example configuration generation, in accordance with embodiments described herein.

The following detailed description refers to the accompanying drawings. The same reference numbers in different drawings may identify the same or similar elements.

Embodiments described herein provide for the use of machine learning techniques to determine an optimal configuration of nodes and/or containers installed on the nodes, based on input parameters. The input parameters may specify, for instance, configuration criteria for a desired configuration of a set of containers and/or a set of nodes. For example, the configuration criteria may specify a set of containers to install on a set of nodes, parameters of the containers (e.g., resources consumed or required by the containers, or other parameters), and/or parameters of the nodes on which to install the set of containers (e.g., resources associated with the nodes, such as total or available processor resources, memory resources, storage resources, etc.).

As referred to above, a "node" may be a deployment infrastructure for containers, and may refer to a VM (e.g., a discrete set of resources associated with one or more hardware machines) and/or a "bare metal" machine (e.g., a set of resources associated with one particular hardware machine). A "container" may be a deployment which utilizes the hardware resources of the infrastructure in which it is configured. For example, a container deployed on a node may utilize the resources of the node, including underlying "virtualized" hardware (e.g., hardware provisioned for the node) when applicable.

As described herein, machine learning and/or other suitable techniques may be used to create VM configurations (also referred to herein simply as "configurations"). A configuration may be an arrangement of containers placed in one or more nodes. "Placing" a container may include installing, instantiating, etc. the container on a particular node. Further in accordance with some embodiments, each configuration may receive a configuration score associated with the utilization of one or more resources in that configuration and/or other factors. As discussed herein, a configuration score may indicate, for example, the utilization or non-utilization (e.g., remaining) of one or more resources of one or more nodes, the number of nodes used for a given configuration, and/or other factors. In some embodiments, the generated configuration score may be based on performance metrics associated with the configuration (e.g., processing speed, network throughput and/or latency, etc. of one or more of the nodes and/or containers included in the configurations). The generated configurations may be stored in a repository for future use by a configuration optimization system ("COS"), in accordance with some embodiments.

For instance, as described herein, COS 101 may receive information regarding available nodes, receive configuration criteria specifying one or more containers to deploy and/or parameters associated with nodes on which to deploy the containers, select a particular configuration based on these factors, and deploy the specified containers across a set of nodes in a manner that is based on the selected configuration. The particular configuration may also be selected based on one or more configuration scores associated with the particular configuration. COS 101 may place the one or more containers (e.g., as specified in the configuration criteria) on a selected set of nodes. As discussed herein, COS 101 may be, or may include, a device or system that is able to provision resources of nodes, and/or is able to install, configure, instantiate, etc. containers onto nodes. In order to perform these functions, COS 101 may use an application programming interface ("API"), such as the Kubernetes API.

As described herein, COS 101 may generate, and/or may simulate the generation of, multiple configurations. As shown in FIGS. 1A-1H, for example, the generation of an example configuration, as shown in these figures, may be represented and/or conceptualized in the form of the traversal and/or generation of a tree. As described herein, COS 101 may incrementally place containers, associated with a given configuration, in one or more nodes until all containers are placed, until the resources of all available nodes are exhausted or full, or until containers can otherwise no longer be placed in available nodes (e.g., due to affinity or anti-affinity rules).

COS 101 may, for instance, generate one or more "tiers" of the tree, where each tier includes a set of branches. While discussed in greater detail below, generally speaking, different branches may represent alternate arrangements of one or more containers placed in a node. Each tier may be generated based on a root, where the root includes a particular set of containers placed in the node. By way of example, two different branches of a given tier may thus include the particular set of containers associated with the root for that tier, and one of the two branches may additionally include a first container placed in the node, while the other one of the two branches may include a second container placed in the node (and not the first container). As described herein, COS 101 may select a particular branch in a tier to serve as a root for a next tier.

For example, a branch may be selected to serve as a root for additional branches based on an associated branch score and/or other criteria. Generally speaking, these branch scores may reflect a measure of efficiency, performance, or other suitable metric associated with each branch. The traversal and selection may iterate until a tier is reached where no new branches may be created (e.g., when all containers in the configuration have been placed on a node, and/or when all available nodes associated with the configuration are full and/or cannot otherwise accommodate more containers). As described further below, a particular configuration, containing a finalized set of branches, may be identified (e.g., based on an associated score) as an optimal configuration for a given set of configuration criteria, and the optimal configuration may be provided (e.g., installed, instantiated, etc.) once selected. As described herein, COS 101 may be, or may include, a device or system that is able to simulate resources utilized by containers and nodes.

As shown in FIG. 1A, for example, COS 101 may generate a first tier of the tree, containing an initial set of branches, based on a particular set of containers and nodes. Other configurations (e.g., not depicted here) may be include different sets of containers and/or different sets of nodes on which to place the containers. As shown in FIG. 1A, container list 103 may provide an identification, order, and resource scores associated with each of a set of containers. As further shown in FIG. 1A, node list 105 may indicate an identification, order, and node resource scores associated with each node of a set of available nodes. As described herein, each node may be associated with a particular set of resources. Nodes may be described or referred to as having a "resource score," which may be a score that is derived from, and/or otherwise reflects, an amount of resources associated with each node (e.g., a resource capacity of the node).

A resource score for a node may be an "overall" resource score that is based on all of the resources associated with a given node, such as processor resources, memory resources, storage resources, etc. As another example, a particular resource score for a given node may reflect only a particular resource, or only a subset of the resources associated with the node (e.g., processing resources and/or memory resources, but not storage resources, etc.). Resource scores, as discussed herein, may have values that are different from the resources indicated by the resource scores. For example, a node with 32 GB of memory may have a resource score of 10, while a node with 64 GB of memory may have a resource score of 12. In the example of FIGS. 1A-1H, all of the candidate nodes have the same resources (and the same resulting overall resource score). In practice, and as elaborated on further below, similar concepts may apply for nodes with varying levels of available resources.

Each container may also have resource scores, indicating resources used by, required by, and/or otherwise associated with the container. For instance, the resource score for container C1 (as indicated in container list 103) may be 20, the resource score for C2 may be 32, and so on. As with the resource scores for nodes, the resource scores for containers may be derived from or based on some or all of the resources that are consumed, required, utilized, etc. by the containers.

FIG. 1A illustrates an example initial rollout of branches, in accordance with some embodiments. An initial rollout may be the first iteration of branch generation in which containers are placed in a node. As described herein, each branch may represent alternate placements from which a particular branch may be selected to generate additional branches. For example, as shown, when generating the first iteration of branches, COS 101 may place (at 1), or simulate the placement of, C1 in N2, utilizing 20 of the available 200 resources from N1. As further shown, COS 101 may place (at 2) C2 in N2, utilizing 32 of the available 200 resources from N2, and COS 101 may place (at 3) C3 in N2, utilizing 28 of the available 200 resources in N3. COS 101 may select one branch, of the first iteration of branches, to generate additional iterations of branches. While shown as generating three branches, in practice, COS 101 may generate more or fewer branches in each iteration (e.g., one branch, two branches, twenty branches, etc.). While shown as placing one container in each selected branch, in some embodiments, COS 101 may place more than one container in each branch and generate a branch score for each generated branch based on each placed container. In other words, COS 101 may generate an iteration by placing multiple containers in each selected branch for each generated branch. In some embodiments, COS 101 may select a single node to generate a first iteration (e.g., place one or more different containers in the same node).

As further shown in FIG. 1A, after generating a branch, COS 101 may generate one or more branch scores. Generally speaking, the branch score may be based on an amount of resources utilized by containers installed on one or more nodes associated with the branch. In some embodiments, the branch score may be based on a value derived from an amount of a node's resources consumed by one or more containers placed in the node, such as a resource score associated with the one or more containers, and/or a resource score of the node reflecting an amount of resources available after the one or more containers are placed in the node. In some embodiments, the score may be based on one or more other factors. For example, as discussed in detail below, these other factors may be used in selecting alternate branches in subsequent iterations of the configuration generation process exemplified in FIGS. 1A-1H.

For example, as shown in FIG. 1A, COS 101 may generate a resource score (e.g., a score indicating the amount of resources remaining in a branch) and/or a branch score (e.g., a score aggregating one or more criteria associated with the branch) for one or more branches. In some embodiments, a branch where available resources are fully utilized may receive a more optimal (e.g., higher) branch score than a branch which leaves resources of one or more nodes unused. In some embodiments, a branch which has remaining resources exceeding a threshold may be associated with a higher branch score. The threshold may indicate, for example, a preference for a node to leave a resource remaining above the threshold so that it may be utilized in the future. In other words, for example, leaving a relatively small amount of available resources (as compared to the amount of resources typically used by a container) may reflect a relatively small likelihood that another container would be able to utilize these resources in the future, while leaving an amount of resources that are generally close to the amount of resources that are used or required by containers may reflect a relatively larger likelihood that another container would be able to utilize these resources in the future.

In some embodiments, the threshold may be based on machine learning and/or other techniques used to identify a suitable threshold (e.g., relatively common or frequent amount of resources used by containers). For example, machine learning and/or other techniques may be used to determine that existing or previously generated configurations tend to include containers with a resource requirement or utilization of 3 or more, the threshold may be set at 3 (e.g., branches with nodes which have a remaining resource score below 3 may score lower than branches with nodes exceeding a resource score of 3), and/or the threshold may reflect that remaining resource scores having a multiple of 3 are preferred to resource scores having multiples other than 3. While shown as a numerical value, a branch score may be represented by other scales, for example, a classification rating (e.g., grade A, grade B, etc.) and/or other ratings.

Branch generation may occur, for example, based on received criteria. Criteria may indicate, for example, an order for placement of nodes, an order for placement of containers, a prioritization of one or more resources, a time limit, an iteration limit, a number of branches to generate for each tier, and/or other criteria. COS 101 may perform iterations of branch generation until reaching one or more limiting criteria (e.g., a time limit, an iteration limit, etc.). In some embodiments, COS 101 may be configured to generate iterations of branches until COS 101 determines an optimal configuration can be generated. An optimal configuration may be determined, for example, when a score associated with one or more branches exceeds a score threshold. In some embodiments, branch generation may cease when the difference in scores between different branches falls below a threshold. In other words, if generating additional branches would not yield more optimal configurations, then COS 101 may discontinue generating additional branches.

Figure 1B:
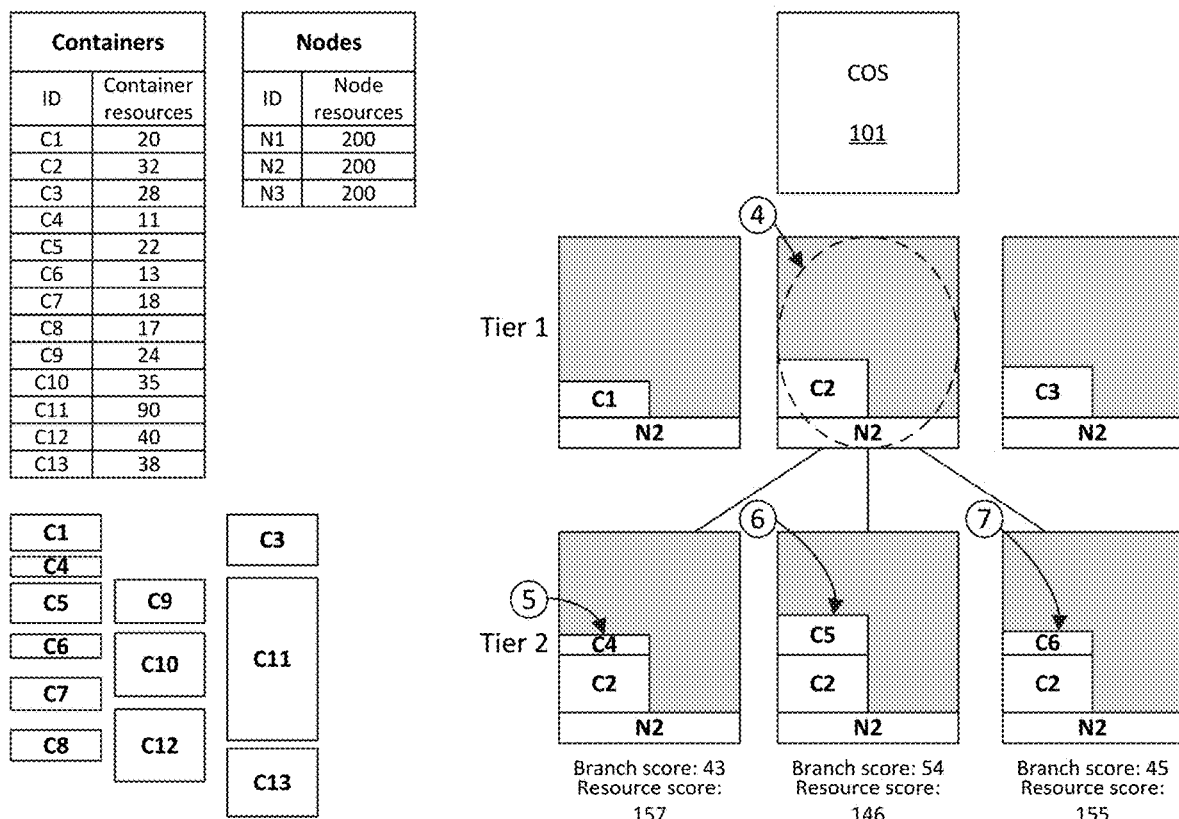

FIG. 1B illustrates an example iteration of selecting a branch and placing containers in the branch to create new branches. As shown, COS 101 may select (at 4) the branch with the most suitable (e.g., highest) branch score (as indicated by the dashed ellipse encompassing the middle branch in Tier 1, which has a branch score of 32). Once selected, COS 101 may start an iteration of branches in a second tier, in which COS 101 simulates the alternate placement of different containers in the same node (i.e., N2). As shown, COS 101 may place (at 5) C4 in a first branch of Tier 2, may place (at 6) C5 in a second branch of Tier 2, and may place (at 7) C6 in a third branch of Tier 2. As similarly described above, each branch may receive a branch score based on the resource utilization in the branch. As shown in FIG. 1B, the first branch may receive a branch score of 43, the second branch may receive a branch score of 54, and the third branch may receive a branch score of 45.

Figure 1C:
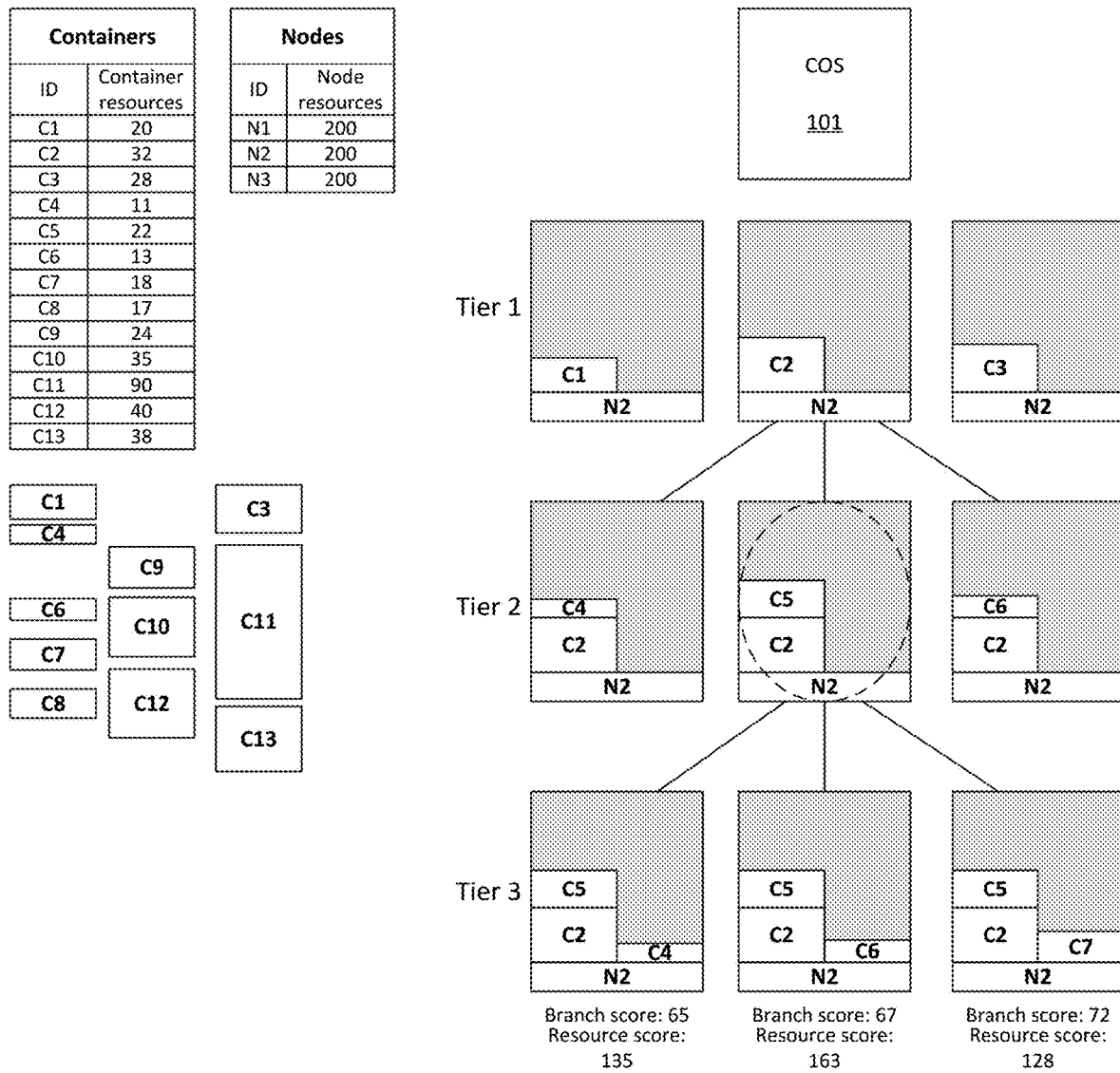

FIG. 1C illustrates a further iteration of selecting a branch and placing containers in the branch to generate a new tier. As shown in FIG. 1C, COS 101 may select the branch in Tier 2 with the most suitable branch score (as indicated by the dashed ellipse encompassing the middle branch in Tier 2, which has a branch score of 54). COS 101 may place containers in the selected branch (i.e., the branch with C2 and C5) to create Tier 3. In some embodiments, as shown in FIG. 1C, COS 101 may place containers that were used in previous tiers but different branches than the selected branch (e.g., COS 101 may place C4 and C6 in this branch, which were previously included in respective un-selected branches of Tier 2).

In some embodiments, a container may not be placed due to anti-affinity restrictions. Anti-affinity restrictions may be attached to a plurality of containers that cannot be placed together. For example, in some embodiments, a container may not be able to operate in a node where the container has an anti-affinity relationship with a second container.

Figure 1D:
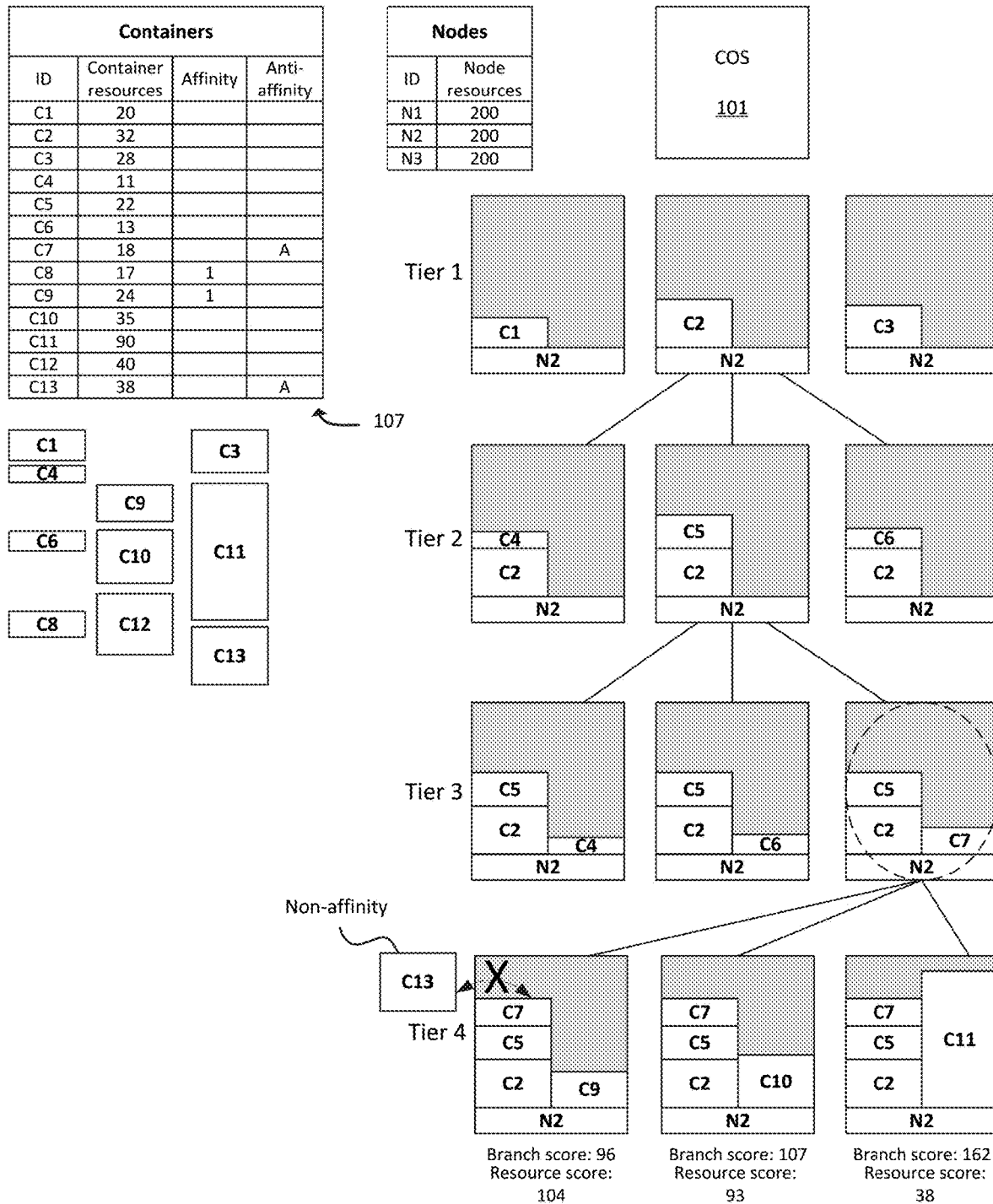
Figure 1E:
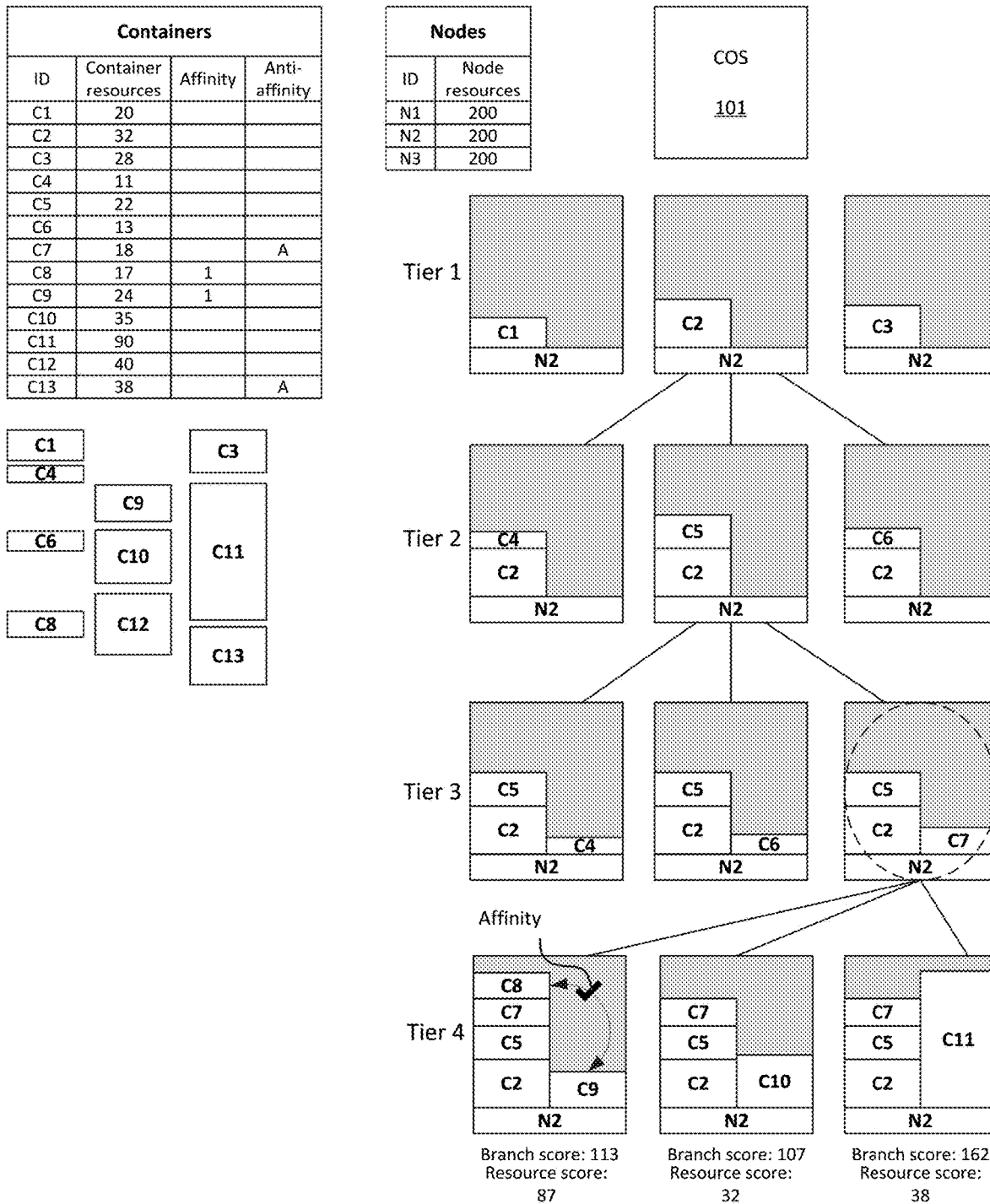

As illustrated in FIG. 1D for example, C13 may have an anti-affinity restriction with C7, which may be indicated in container list 107. For example, container list 107 may indicate a grouping between containers which are in an anti-affinity relationship (as shown by the letter "A" in the anti-affinity column adjacent to C7 and C13). Thus, as shown in Tier 4, COS 101 may not place C13 in a branch which contains C7 (as indicated by the "X" on the double-arrow between C7 and C13). COS 101 may place other containers (i.e., C9, C10, C11) in lieu of C13. Anti-affinity restrictions may maintain a reciprocal arrangement. In other words, anti-affinity restrictions may restrict placement when any of the containers with anti-affinity restrictions are placed. For example, if C13 was placed instead of C7, COS 101 would not be able to place C7 in a branch with C13.

In some embodiments, a container may be placed with another container which shares an affinity relationship. An affinity relationship may exist, for example, between a plurality of containers which must be placed in the same node. In some embodiments, each container in the affinity relationship may be placed when one container in the affinity relationship is placed. For example, as shown in FIG. 1D, assume that C8 has an affinity relationship with C9 (as indicated in container list 107 by the number "1" adjacent to C8 and C9 in the affinity column). When COS 101 places C8, COS 101 may further place C9 in all branches which contains C8. As described above in regard to anti-affinity relationships, an affinity relationship may be reciprocal (e.g., if C9 was placed instead of C8, COS 101 may place C8).

While shown as indicated by either a letter or number, affinity and/or anti-affinity relationship groupings may be indicated by other means. For example, relationships may be marked by a symbol, letter, number, and/or other means of demarcation. In some embodiments, affinity and anti-affinity groupings may be indicated by the same demarcation (e.g., both indicated by numbers, etc.). In some embodiments, COS 101 may generate an initial rollout (i.e., first tier iteration) based on affinity and/or anti-affinity relationships. For example, in some embodiments (not shown), COS 101 may place each container in an affinity relationship in the first tier of a node (i.e., in Tier 1, COS 101 may place C8 and C9). As a further example (not shown), COS 101 may initially place each container in an anti-affinity relationship in a different node (e.g., COS 101 may place C13 and C7 in different starting nodes).

Figure 1F:
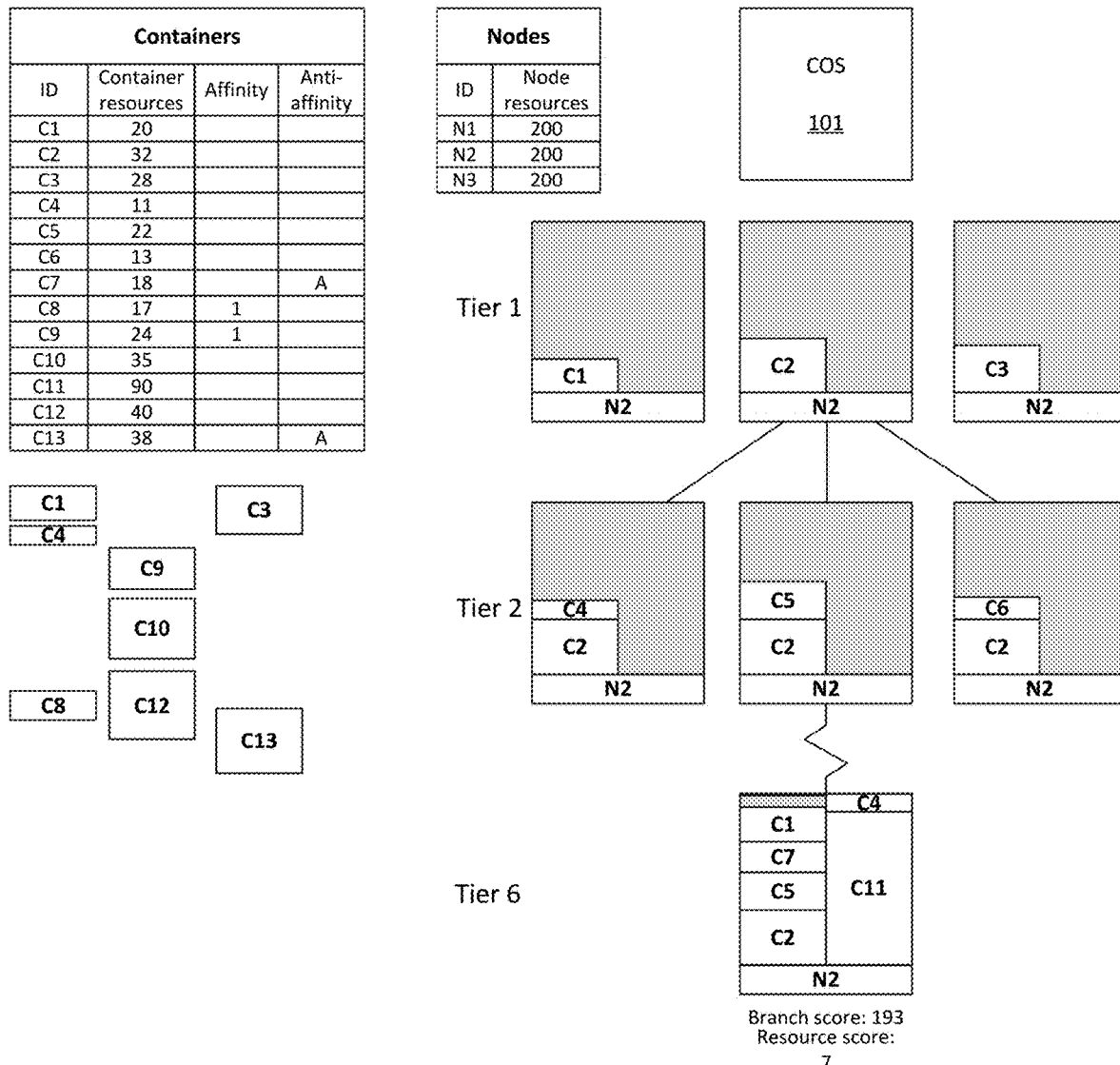

After multiple iterations are performed, a resulting branch may include a node which cannot accommodate additional containers. A node may not accommodate additional containers, for example, when a node is full (e.g., may not have resources available), may not have enough resources to place any remaining containers (e.g., all non-placed containers have a resource requirement exceeded the available space on the node), may have a different resource available than containers utilize (e.g., a node may have available resources of a different type than the container requirement), may be restricted by anti-affinity restrictions (e.g., one or more containers placed in the node prohibits the placement of one or more remaining containers in that node, all remaining containers to be placed cannot be placed based on anti-affinity relationships, etc.), no other containers remain to be placed, and/or other situations. For example, as shown in FIG. 1F, COS 101 may generate a branch (at Tier 6) which cannot receive additional containers. In this example, no container from container list 107 may fit in N2 (after the placement of C1, C2, C4, C5, C7, and C11), because N2 does not have the resources required for any of the remaining containers. That is, in this branch, only 7 resources remain on N2, and each unplaced container requires more than 7 resources.

Figure 1G:
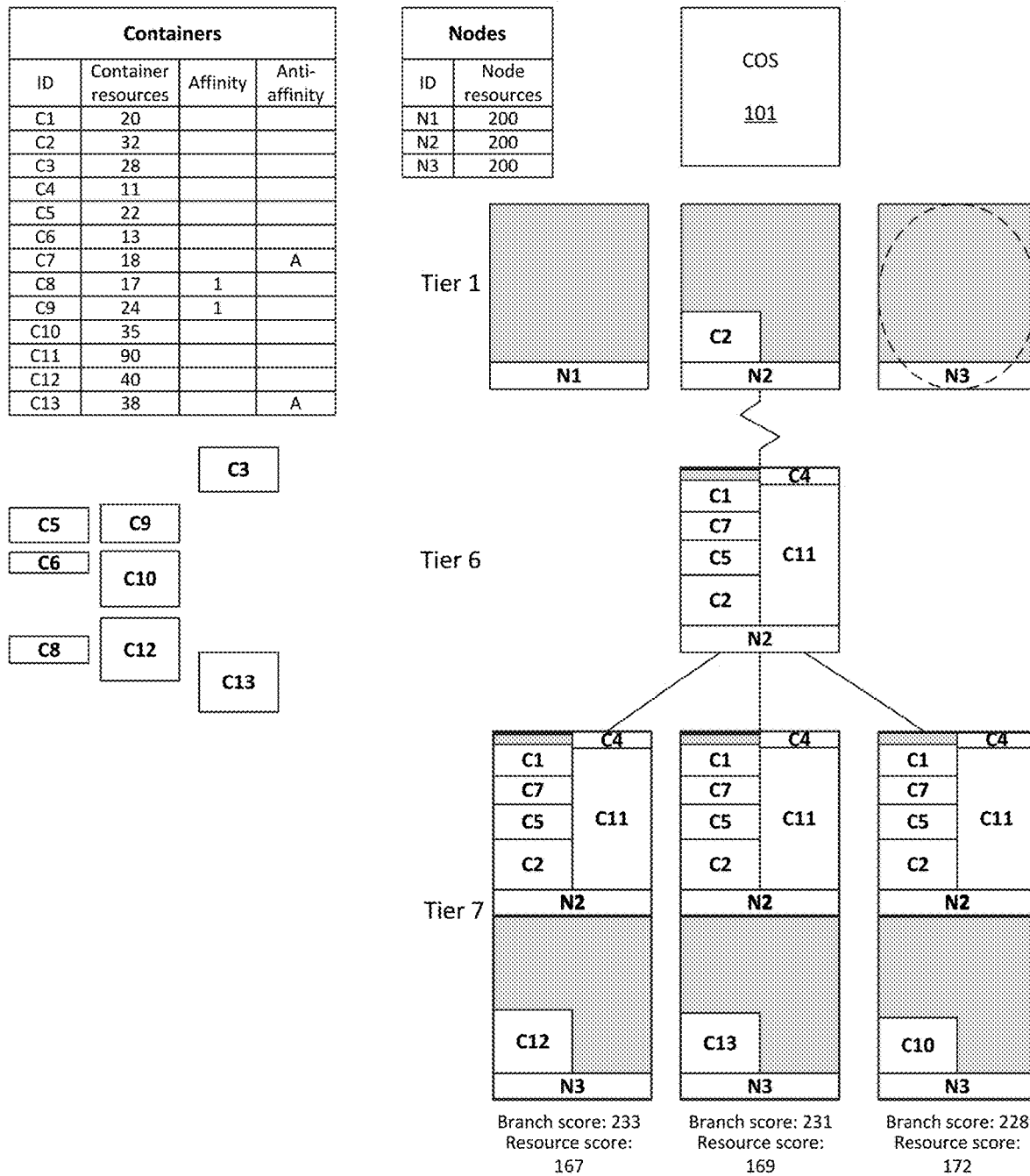

In some embodiments, COS 101 may select a second node to generate a series of branches (e.g., when a first node is full, and/or cannot otherwise accommodate any further containers). For example, FIG. 1G illustrates selecting a different node to generate branches. COS 101 may select a different node to place containers when, as discussed above, a first node is not able to continue to place containers, and/or for other reasons. A second node may be selected based on a branch score, a node order (e.g., as shown in node list 105), and/or other criteria. For example, FIG. 1G illustrates an example of selecting N3 when N2 is unable to receive additional containers (e.g., as described above, N2 as shown in Tier 6 does not have enough remaining resources to place any unplaced container). COS 101 may select N3 (as shown by the dashed ellipse) based on the node order (i.e., as shown in node list 107, N2, and then N3) to generate an iteration of branches. As shown, COS 101 may generate an additional iteration of branches by placing C12 (for a branch score of 233), by placing C13 (for a branch score of 231), and by placing C10 (for a branch score of 228) into three separate branches utilizing N3.

Figure 1H:
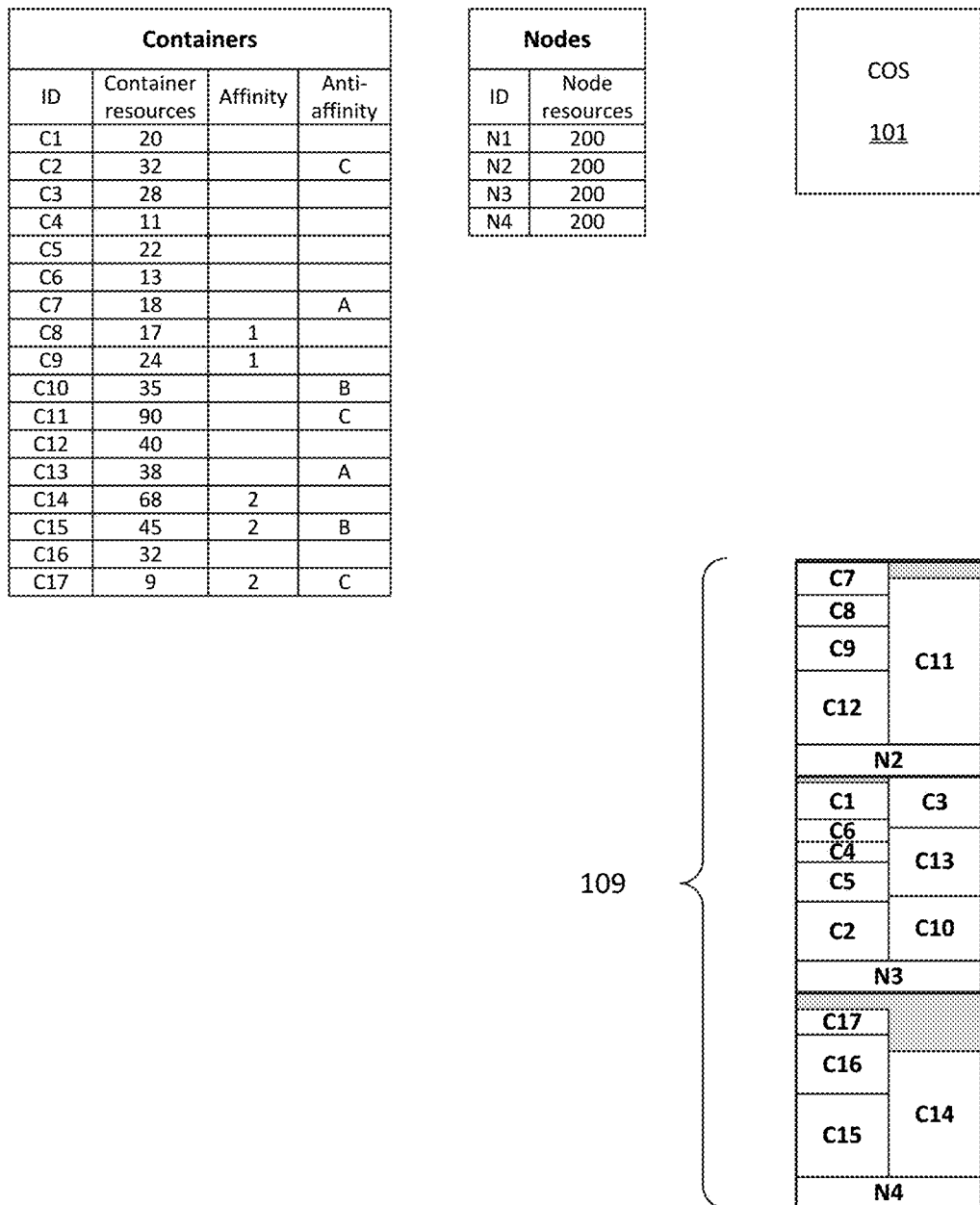

Based on the selection of N3, COS 101 may continue to generate branches and/or tiers based on the placement of C12 in N3. A complete configuration may include the highest scoring (e.g., branch score) branch utilizing each node from node list 105 and/or may include a placement for all containers from container list 103. For example, as shown in FIG. 1H, several iterations of placement may result in configuration 109. As shown in configuration 109, N1 may not be utilized. Configuration 109 is one possible solution for the placement of containers in nodes, and other suitable configurations may exist. COS 101 may generate multiple configurations based on generation parameters. Generation parameters may include, for example, an indication to prioritize placement of resource(s) (e.g., prioritize Resource 1, then Resource 2, and then Resource 3, etc.), a number of iterations to generate, a number of configurations to generate, a time limit for generation, and/or other criteria.

In some embodiments, a COS 101 may generate one or more configuration scores for a configuration based on one or more criteria, such as resource utilization (e.g., amount of resources used and/or left unused by a given configuration), node utilization (e.g., the number of nodes utilized by the configuration, etc.), and/or other criteria. For example, a configuration where available resources of a set of nodes are fully utilized may receive a more optimal (e.g., higher) configuration score than a configuration which leaves some resources of one or more nodes unused. In some embodiments, COS 101 may generate a configuration score for a configuration based on the branch scores associated with each branch constituting the configuration. A configuration and related configuration and/or branch scores may be stored in a repository.

Figure 2A:
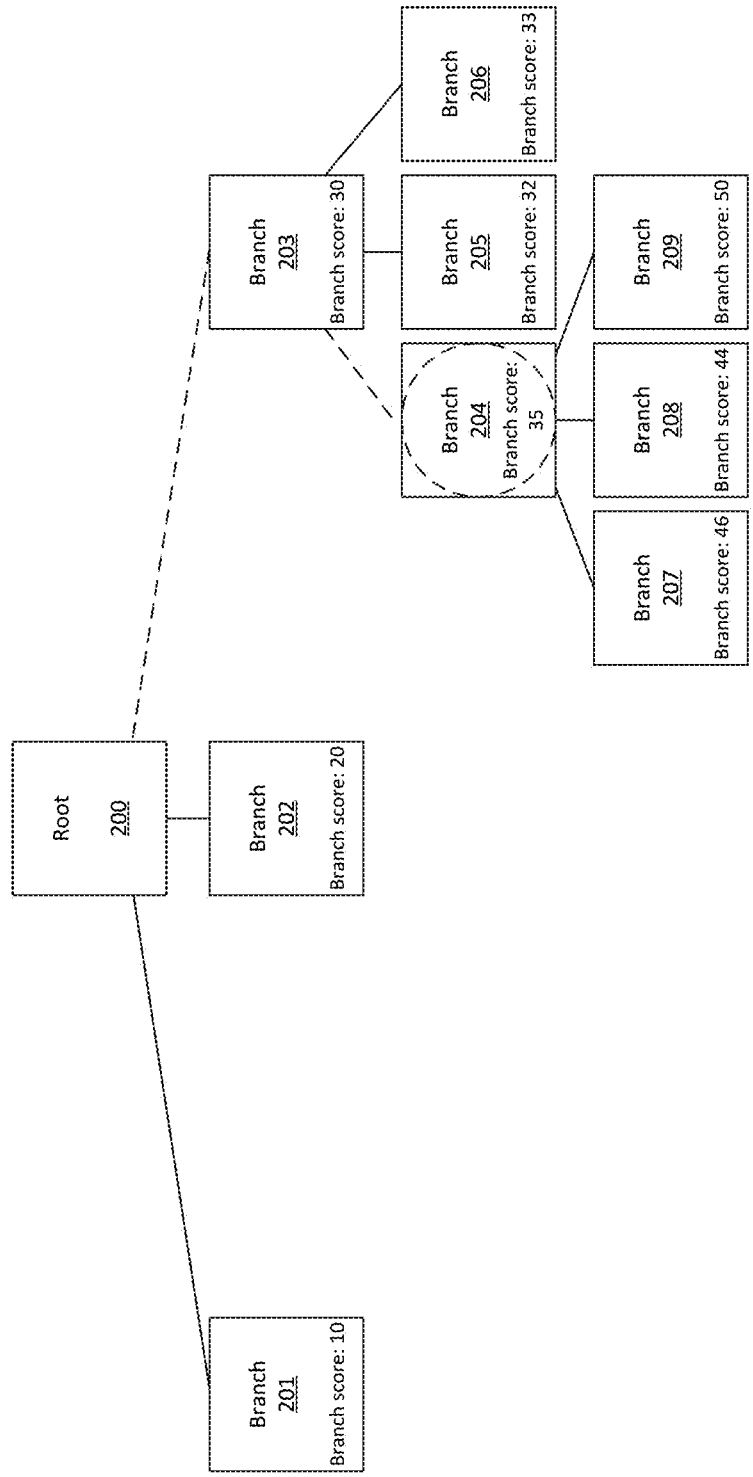
FIGS. 2A-2D illustrate the example generation of multiple configurations, in accordance with embodiments described herein.

In some embodiments, branches may be selected based on varying criteria, and/or different branches may be expanded/selected in order to generate different configurations. As shown in FIG. 2A, for example, COS 101 may select a first branch (shown in the figure as root 200) to generate new branches. As discussed above, this branch may indicate a particular container, or set of containers, placed on a particular node or set of nodes. Assume, for example, that COS 101 is configured to generate additional branches until a particular limiting criterion (e.g., time limit, iteration limit, etc.) is identified, and further, that COS 101 has not yet identified a limiting criterion.

As shown, COS 101 may generate three branches (e.g., at a next tier): branch 201 with a branch score of 10, branch 202 with a branch score of 20, and branch 203 with a branch score of 30. As discussed above, these three branches may indicate the alternate arrangement or placement of containers into one or more nodes, based on the arrangement or placement of containers already indicated by root 200.

In accordance with some embodiments, COS 101 may select a new branch (i.e., branch 203, in this example) to serve as a root to generate additional branches. As similarly discussed above, branch 203 may be selected based on the branch score (i.e., branch score of 30) associated with branch 203. As shown, once selected, branch 203 may be used as a root to generate three additional branches: branch 204 with a branch score of 35, branch 205 with a branch score of 32, and branch 206 with a branch score of 33. COS 101 may select branch 204 to serve as the root to generate additional branches. For example, this selection may be based on identifying that branch 204 is associated with the highest score out of the branches for this tier.

As discussed above, in some embodiments, COS 101 may traverse through the generated tree based on the highest scoring branch in each tier. For example, as shown in FIG. 2A, COS 101 may traverse through branch 203 (i.e., with a branch score of 30) to select branch 204 (as indicated in the figure by the dashed ellipse) with a branch score of 35 to generate new branches. As shown, COS 101 may generate branch 207 with a branch score of 46, branch 208 with a branch score of 44, and branch 209 with a branch score of 50.

In some embodiments, a branch score may be modified across multiple iterations. For example, a branch score may be modified to balance between "exploitation" and "exploration" in selecting branches for generation. Exploitation may generate additional high scoring branches based on previously high-scoring branches (e.g., based on branch score). In other words, COS 101 may "exploit" a high-scoring branch by generating additional high-scoring branches based on that branch. In contrast, "exploration" may, for example, utilize relatively lower scoring branches. In other words, exploration may encourage the selection of relatively lower-scoring branches to generate additional branches by, for example, modifying the branch score associated with a branch (e.g., a branch in a tier where another branch was selected) in order to increase the likelihood that the branch will be selected in a subsequent iteration.

In some embodiments, a branch score for a particular branch may be modified based on the number of times the particular branch is "traversed," modified based on the number of total iterations of branch generation that have occurred, modified based on the average branch score for branches utilizing the particular branch as a root (e.g., each branch created with the particular branch as a root), and/or modified based on other factors. As described herein, a particular branch is "traversed" when the particular branch is utilized in creating a branch (e.g., selected to serve as a root to generate branches), serves as the root for a future branch (e.g., when a second branch is generated based on the particular branch, the particular branch may be traversed multiple times), and/or in other situations. For example, COS 101 may generate a branch score based on Formula 1:

$$S_i = x_i + C\sqrt{\frac{\ln(t)}{n_i}} \quad \text{(Formula 1)}$$

In Formula 1, "$S_i$" may represent the branch score for a particular branch, "$x_i$" may represent the average overall configuration score based on selection of the particular branch, "C" may represent a constant value, such as $$\frac{1}{\sqrt{2}},$$

"t" may represent the number of iterations of generating branches that have taken place, and "$n_i$" may represent the number of times the particular branch has been selected in those iterations of generating branches.

Figure 2B:
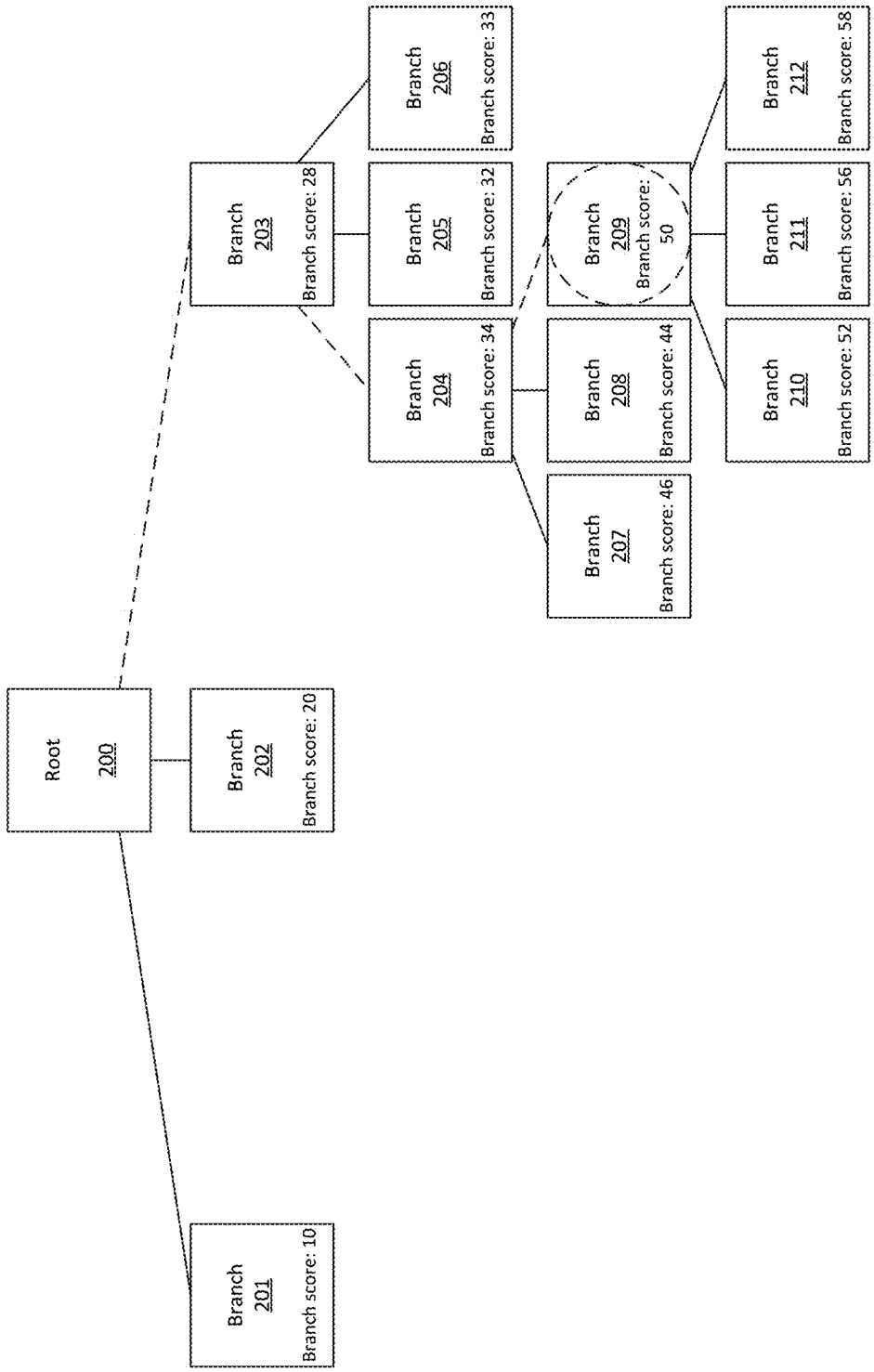

In one embodiment, COS 101 may select branch 209 by traversing the highest scoring branch in each tier as shown in FIG. 2B. As described above, the branch scores associated with branch 203 and branch 204 may be modified based on the traversal of each branch. As shown, the branch score associated with branch 203 may decrease to 28 (from 30) and the branch score associated with branch 204 may decrease to 34 (from 35). As shown, COS 101 may generate a new tier consisting of branch 210 (with a branch score of 52), branch 211 (with a branch score of 56), and branch 212 (with a branch score of 58).

The selection of the branch is shown for explanatory purposes only. As discussed below, the selection of a previous branch can occur at one or more other branches in one or more different tiers. For example, while shown as selecting a branch from Tier 2, selection may occur from another tier (Tier 3, Tier 4, etc.). In some embodiments, a branch may be selected and a modified container list may be utilized to place containers in the node. In other words, COS 101 may select the same branch as a root, but utilize a different arrangement of containers (e.g., different container placement order, etc.) to generate a different branch.

In some embodiments, different iterations may be generated in a random fashion, and/or a sequential fashion (e.g., placing nodes in different sequences, moving the first node to the end of the list in subsequent iterations). In some embodiments, different iterations may be generated and/or scored (e.g., branch score) based on machine learning and/or other suitable techniques. For example, COS 101 may identify branches with relatively high branch scores (e.g., as compared to other configurations with the same branches to place), and may identify characteristics of these branches, including resource scores of placed containers, sequences in which the containers are placed, resource scores of branches on which the containers are placed, and/or sequences of nodes on which the containers are placed. In some embodiments, COS 101 may generate a ranked list of sequences of containers to place and/or nodes on which to place them, based on identifying characteristics of branches with relatively high scores. When generating new branches, COS 101 may, in some embodiments, generate branches in a sequence that is based on this ranked list.

For example, COS 101 may identify that a set of branches and/or configurations, in which containers are placed in the order C1, C3, C5, C2, and then C4 (and so on), tend to have higher branch scores (e.g., an average, median, or other measure of the branch scores) than a set of branches and/or configurations in which containers are placed in the order C5, C4, C3, C2, and then C1 (and so on). Thus, in subsequent iterations, COS 101 may generate and score branches and/or configurations based on the order C1, C3, C5, C2, and then C4 (e.g., using this same order, or with variations based on this order) before generating and scoring branches and/or configurations based on the order C5, C4, C3, C2, and then C1. Additionally, or alternatively, COS 101 may generate and score branches and/or configurations in a weighted manner, in which COS 101 generates and scores more branches and/or configurations that are based on the order C1, C3, C5, C2, and then C4 than branches and/or configurations that are based on the order C5, C4, C3, C2, and then C1.

Figure 2C:
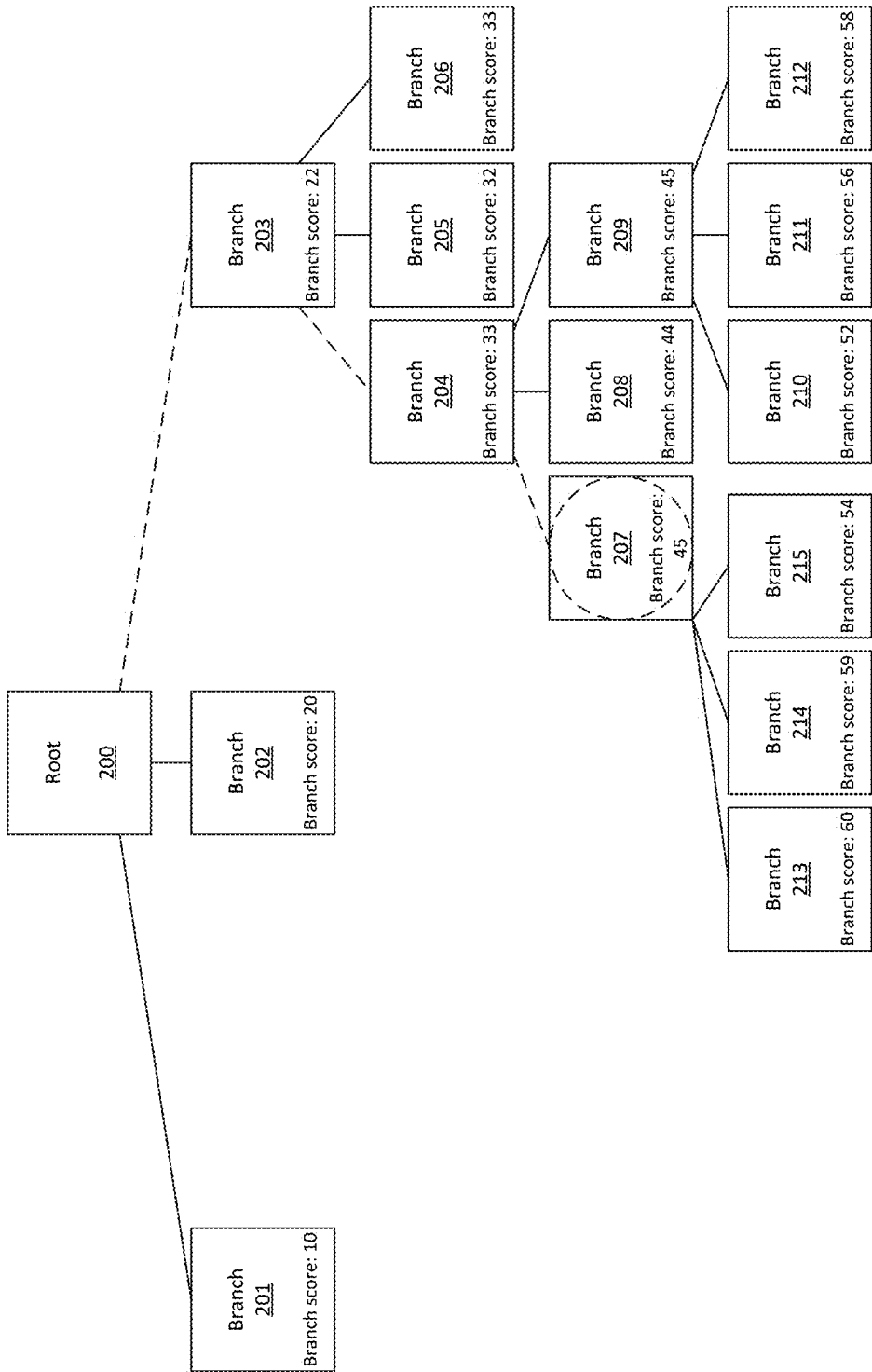

As further shown in FIG. 2C, COS 101 may select branch 207 from the same tier as branch 209 to generate new branches. As described above, COS 101 may select from a previous tier based on a branch score and/or for other reasons. For example, assume that none of the branches generated based on branch 209 (i.e., branch 210, branch 211, and/or branch 212) have suitable container placements because the branches are restricted by anti-affinity restrictions. Therefore, COS 101 may select branch 207 to generate additional branches. As described above, when COS 101 utilizes branch 207 to generate additional branches, COS 101 may modify (e.g., decrease) a branch score associated with each branch on which branch 213, branch 214, and branch 215 were based (i.e., branch 203, branch 204, branch 207, etc.).

Figure 2D:
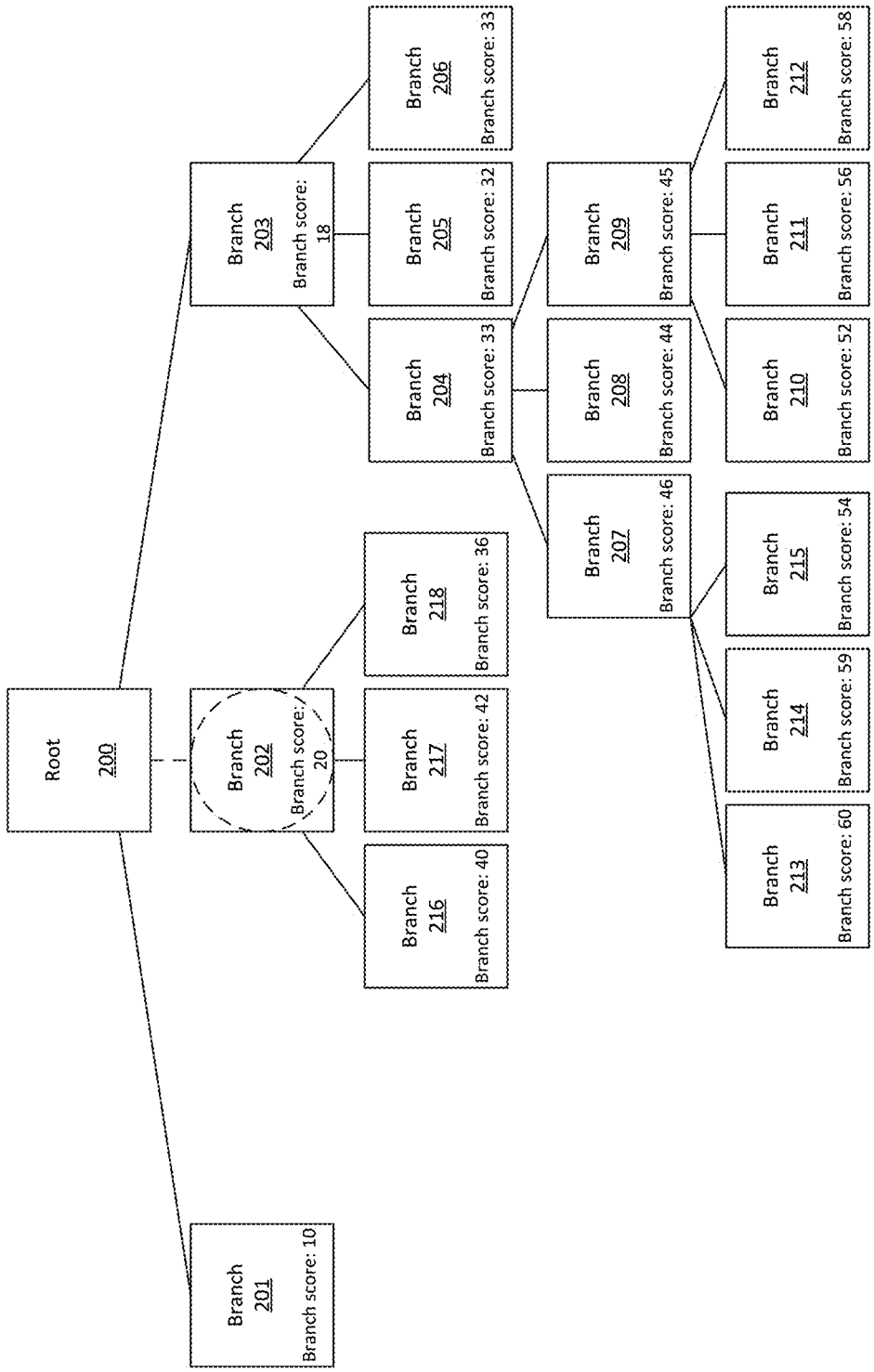

As shown in FIG. 2D, as a result of the modified branch score associated with branch 203, COS 101 may select a different branch from that tier as a root for new branches. For example, COS 101 may select branch 202 to generate new branches (i.e., branch 216 with a branch score of 40, branch 217 with a branch score of 42, and branch 218 with a branch score of 36).

In some embodiments, COS 101 may stop iterating the generation of branches for a particular set of nodes and/or containers based on determining that a limiting criterion has been reached. This limiting criterion may indicate, for example, that branch generation should cease when an optimal score has been reached. In some embodiments, an "optimal" score may be reached when, for example, the score difference between branches representing a complete configuration (e.g., configuration scores, which may be associated with "leaves" of the tree) is below a threshold. In other words, if multiple configurations are associated with a similar (or same) configuration score, COS 101 may determine that an "optimal" score has been reached, and may cease generating configurations based on one or more branches from which the configurations with similar scores have been generated. As another example, COS 101 may determine that an "optimal" score has been reached when one or more configuration scores (and/or a score associated with a branch representing a completed configuration, such as a "leaf" of the tree) exceed a threshold value.

In some embodiments, COS 101 may continue generating branches based on one or more other limiting criteria. These limiting criteria may include, for example, a limit on the amount of time spent generating configurations and/or branches for a given set of containers and nodes (e.g., 20 seconds, 60 seconds, 30 minutes, etc.), a limit on the quantity of branches generated, and/or some other limiting criteria.

As described above, a configuration may be generated by identifying the highest scoring branch in each tier, and selecting that branch as a root for generating the next tier. Once a configuration is generated, COS 101 may (e.g., on a subsequent iteration) select a particular branch, which was not previously traversed in a previous iteration, to generate another (e.g., alternate) configuration.

Figure 3:
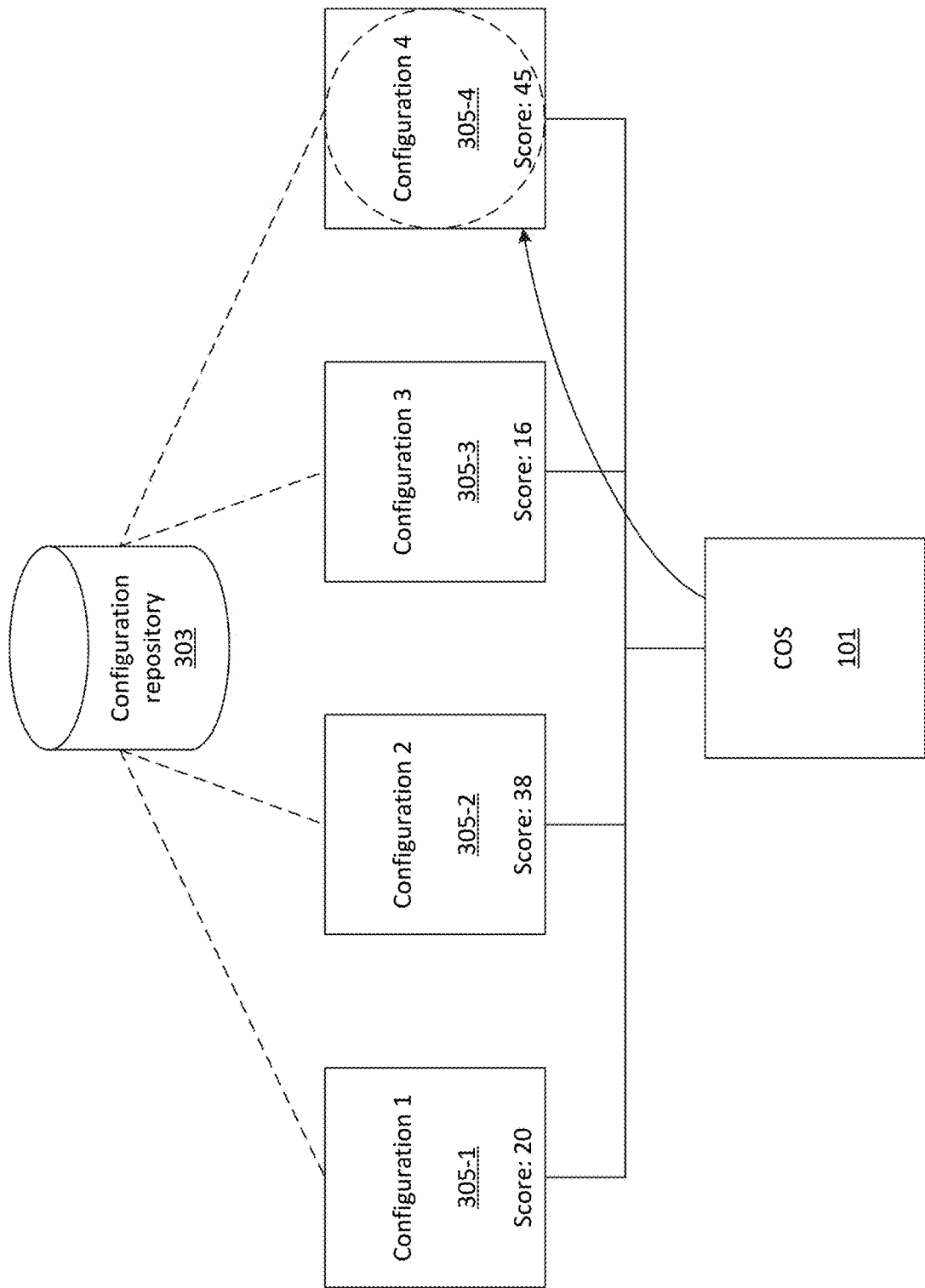
FIG. 3 illustrates an example selection of a particular configuration, in accordance with embodiments described herein.

Once multiple configurations are generated, COS 101 may choose from the generated configurations, in order to fulfill a request for a configuration that matches (or most closely matches) a set of input parameters (e.g., specifying parameters of containers to instantiate on one or more nodes, parameters associated with the set of nodes, one or more types or resources to optimize and/or other criteria specifying how to rank or generate configuration scores for configurations, etc.). For example, as shown in FIG. 3, COS 101 may receive several configurations (e.g., as shown configurations 305-1-305-4) from configuration repository 303. Some or all of the configurations, stored in configuration repository 303, may have been generated and/or scored by COS 101 (e.g., as similarly discussed above). As discussed above, each configuration may be associated with one or more configuration scores. In some embodiments, COS 101 may rank configurations based on their configuration scores and select a configuration based on the ranking (e.g., a configuration with a highest configuration score) to fulfill a request for a configuration. As discussed below, a particular configuration score, out of a set of configuration scores for each configuration, may be used to select a particular configuration. For example, the input parameters may specify that processing resources should be optimized. COS 101 may thus rank configurations according to scoring of processing resources when selecting a particular configuration to provide in response to the request.

Figure 4:
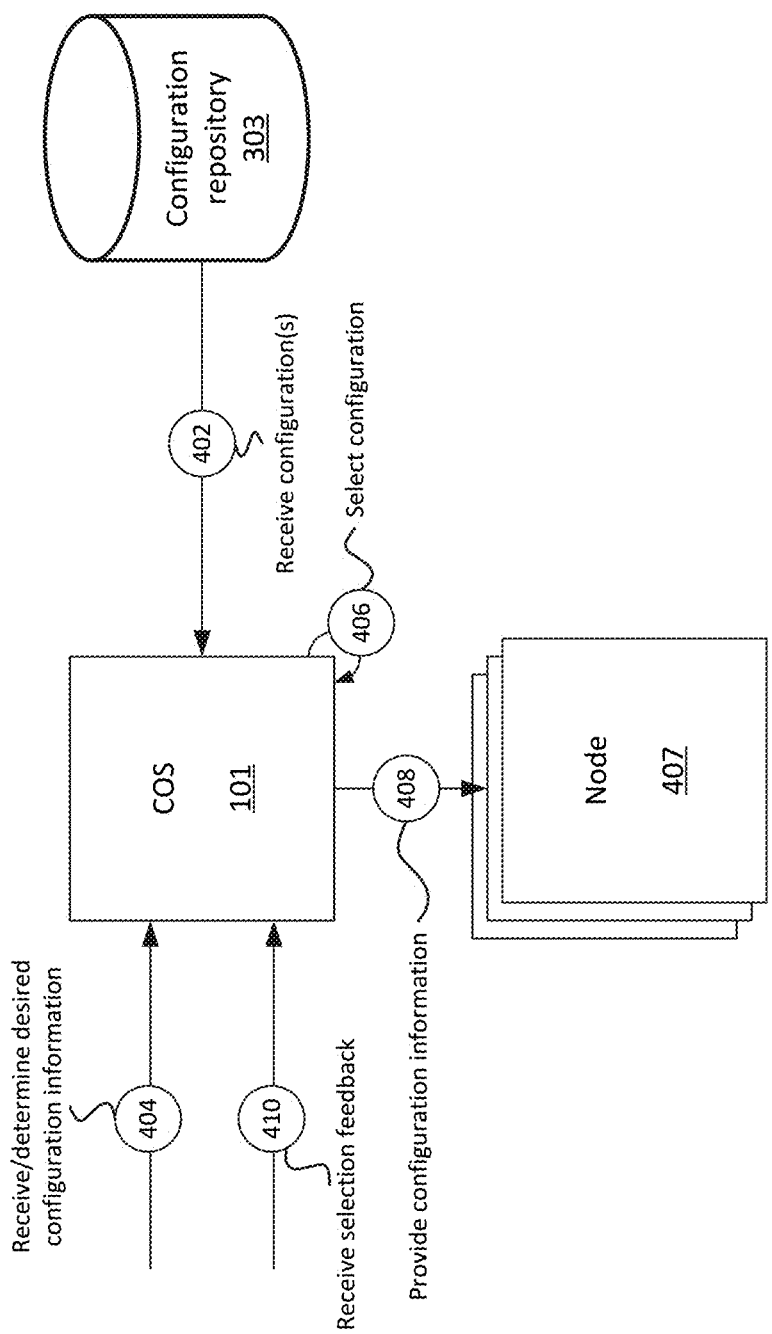
FIG. 4 illustrates an example of selecting and configuring a particular configuration, based on input configuration parameters, out of a set of candidate configurations (e.g., as generated and/or scored in accordance with some embodiments)

FIG. 4 illustrates an example of selecting and configuring a particular configuration, based on input configuration parameters, out of a set of candidate configurations. As shown in FIG. 4, for example, COS 101 may receive (at 402) a set of configurations from configuration repository 303. As described above, configuration repository 303 may maintain information regarding several configurations, including one or more configuration scores associated with each configuration (e.g., as determined by COS 101).

As further shown in FIG. 4, COS 101 may receive and/or determine (at 404) configuration information indicating parameters of a desired configuration. The parameters of the desired configuration may include information regarding one or more containers to be placed in one or more nodes. In some embodiments, the configuration information may specify attributes of the nodes in which to place the containers, such as the quantity of nodes, resources associated with the nodes, etc. In some embodiments, COS 101 may have access to a pool or set of candidate nodes 407, on which one or more containers may be instantiated (and/or may have access to a cluster or other set of resources, on which nodes 407 can be provisioned). In some embodiments, nodes 407 may be, and/or may implement, components of a network (e.g., a Software-Defined Network ("SDN")), such as a wireless network (e.g., a Fifth Generation ("5G") network). In some embodiments, COS 101 may determine a set of parameters based on a received set of nodes and/or containers. For example, COS 101 may utilize machine learning techniques to determine parameters based on similar sets of nodes and/or containers which were previously configured. In some embodiments, COS 101 may determine configuration information based on a configuration in use. In such an embodiment, COS 101 may receive a configuration of nodes and containers and determine attributes associated with the nodes and/or containers. In some embodiments, COS 101 may determine configuration information based on a configuration in use. In such an embodiment, COS 101 may receive a configuration of nodes and containers and determine attributes associated with the nodes and/or containers. For example, COS 101 may analyze one or more currently existing or installed configurations (e.g., determine a configuration score for an existing configuration), in order to optimize the currently existing configuration based on a corresponding configuration generated by COS 101, which may have a more favorable (e.g., higher) configuration score than the existing configuration.

In some embodiments, the parameters of the desired configuration may include additional configuration criteria, such as an indication that a particular type of resource (e.g., processing resources, memory resources, storage resources, etc.) should be optimized, an indication that the fewest nodes as possible should be used, an indication that the fewest amount of cumulative resources across selected nodes should be provisioned for the configuration, and/or other criteria or combinations of criteria.

In some embodiments, COS 101 may use a generated configuration to "resize" one or more nodes or containers (e.g., nodes and/or containers in existing configurations). "Resizing" nodes and/or containers may include, for example, increasing and/or decreasing the resources associated with a container and/or a node based on one or more factors. For example, containers and/or nodes may be resized based on efficiency with a node and/or container (e.g., the resources utilized by a container may decrease when placed in a particular arrangement, etc.), based on scaling factors (e.g., an over-provisioning and/or an under-provisioning of resources associated with a node and/or container, etc.), and/or some other factors. In some embodiments, COS 101 may resize containers based on available node resources and/or a resize range associated with a container (e.g., a limitation for an increase or decrease in the resource utilization of a container). These limitations may be explicitly indicated (e.g., in metadata associated with containers), and/or may have been determined based on machine learning or other suitable techniques (e.g., an analysis of varying levels of resources used for containers having one or more similar or common attributes).

For example, assume a particular node in a configuration has an amount of a particular resource equivalent to a resource score of 5, and a container placed in the particular node causes the remaining resource score for this particular resource to be reduced to 1 (e.g., consumes an amount of this particular resource equivalent to a resource score of 4). In another manner of considering this example, the particular node may have 5 Terabytes ("TB") of total storage space, and a particular container placed on the node (according to a given configuration) may consume 4 TB of storage space, leaving 1 TB of storage space remaining on the node. In such an instance, COS 101 may resize the container to utilize the additional 1 TB of storage space when placing the container in the particular node. For example, COS 101 may modify the container to utilize 5 TB of storage space, instead of 4 TB.

Similarly, in some situations, the resources associated with a container may be decreased. Assume that a particular container is associated with a range and/or minimum value for a given resource. For example, the particular container may be associated with a storage space of 4 TB, but may also be associated with a minimum storage space of 2 TB. Referring again to the example of this container being placed on a node with 5 TB of total storage space, COS 101 may reduce the storage space associated with the container, so that the remaining storage space associated with the node is greater than 1 TB (i.e., where 1 TB would be left over if the container, utilizing 4 TB of storage space, were placed on the node with 5 TB of total storage space).

COS 101 may, in some aspects, utilize machine learning and/or other techniques to determine the amount to reduce the container's resources by, and/or to determine the amount of resources to leave available after resizing. For instance, COS 101 may analyze a set of configurations (e.g., as generated by COS 101, and/or existing or currently installed configurations) to determine an amount of resources that are likely to be useful or usable. Based on the analysis of configurations, COS 101 may determine that a remaining storage space of 2.7 TB would be likely to be usable by another container (e.g., containers that are likely to be installed on the node may consume or require up to 2.7 TB of storage space). This analysis may include analyzing other configurations to determine particular containers placed on the nodes in these configurations, and determining other containers that are included in the same node and/or configuration as the particular containers. As such, based on this determination, COS 101 may resize the container from utilizing 4 TB of storage space to 2.3 TB of storage space. This resizing would result in the container utilizing at least its minimum storage space of 2 TB, and would also result in the node having 2.7 TB of storage space available (e.g., available for the installation of one or more other containers).

As further shown in FIG. 4, COS 101 may select (at 406) a configuration from the provided configurations. COS 101 may compare the desired configuration information, including any criteria, to the provided configuration. COS 101 may rank each configuration based on the associated configuration score and/or similarity to the criteria (e.g., based on a suitable similarity analysis). In some embodiments, COS 101 may reject (i.e., not select from) a configuration which does not satisfy the desired configuration information. In some embodiments, the selection may be modified based on machine learning techniques. Machine learning techniques may enhance selection by analyzing feedback to determine a confidence level associated with a selection. For example, COS 101 may maintain and/or refine predictive models associated with each configuration (e.g., to strength or weaken a correlation between a given configuration and the received configuration information). Predictive models may contain, for example, information regarding previous selection of the configuration (e.g., the configuration information used to previously select a configuration). Feedback may be used to modify the predictive models. For example, feedback indicating a correct selection based on the same/similar information may strengthen or increase the association of the selected configuration with the criteria or parameters used to select the configuration, whereas feedback indicating an incorrect selection based on the same/similar information may weaken or decrease this association. As described below, different feedback may modify the predictive model score differently (e.g., higher confidence feedback may impact a predictive model score more than lower confidence feedback).

As described above, selection information (e.g., received at 404) may include additional criteria to select a configuration. For example, selection information may include an indication to utilize the fewest number of nodes (e.g., optimize the number of nodes utilized). As described above, each node may represent a discrete set of hardware resources. The optimization of the number of nodes may reduce the hardware requirements for the placement of containers. Some configurations may utilize fewer nodes compared to other configurations when utilizing the same nodes and/or containers.

In some embodiments, selection information may include an indication to optimize a particular resource. As described above, one or more resources may be identified and/or scored for each placed node and/or container. For the sake of example, assume an indication to optimize based on a first resource type, and a first node has a high starting resource score for the first resource type (indicating a high amount of the first resource) and a second node has a low starting resource score for the first resource type (indicating a lower amount of the first resource compared to the first node). Assume further that all containers to be placed may be placed in either the first node or the second node. A configuration utilizing the second node to place all containers may be selected over a configuration utilizing the first node to place all containers because the second node may optimize the first resource type. In other words, a configuration utilizing the second node would leave fewer unused resources of the first resource type. In some embodiments, configuration information may include an indication to optimize more than one resource in order. Assume for the sake of example that three resource types (e.g., Resource 1, Resource 2, Resource 3) are scored and/or identified. The received configuration information may indicate to optimize Resource 1, then Resource 3, and then Resource 2. Selection may occur based on this prioritization for resource optimization. This prioritization may occur, for example, in embodiments where multiple nodes have high starting resource scores.

In some embodiments, configuration information may indicate the selection of a configuration utilizing the fewest amount of cumulative resources across all nodes in the configuration. This selection criteria may, for example, indicate a selection of a configuration wherein the nodes are full (e.g., the resources associated with each node in the configuration are utilized). In some embodiments, a selection based on this configuration information may utilize many nodes with relatively small resource capacity rather than fewer relatively large resource capacity nodes. For the sake of example, assume a first configuration utilizes a single node with a resource score of 20 to place a set of containers using 13 resources, and a second configuration utilizes two nodes with a total resource score of 14 to place the same set of containers using 13 resources. Given an indication to select a configuration based on utilizing the fewest amount of cumulative resources, COS 101 may select the second configuration (i.e., two nodes with a total resource score of 14) despite utilizing two nodes rather than one.

In some embodiments, COS 101 may select a configuration based on a configuration currently in use. For example, COS 101 may analyze a previously configured set of nodes and containers to determine a mismatch with the highest scoring configuration. In such embodiments, COS 101 may select the highest scoring configuration based on the resources associated with nodes and/or containers and/or other parameters. In other words, COS 101 may rebalance a current configuration to better utilize resources in accordance with select parameters.

As further shown in FIG. 4, COS 101 may configure (e.g., install, instantiate, etc.) (at 408) the selected configuration onto node(s) 407 (e.g., each node). COS 101 may configure the selected configuration by utilizing an API (e.g., Kubernetes API, etc.). In some embodiments, COS 101 may be communicatively coupled with another device, such as an orchestration system, which may instantiate the containers of the configuration onto the node and/or may provision the nodes from a cluster of available resources according to the selected configuration. In such embodiments, COS 101 may provide instructions to an orchestration system on how to configure the nodes and/or the cluster of available resources.

COS 101 may receive (at 410) feedback regarding the configured configuration (e.g., from 410). Feedback may be utilized to enhance future selection via machine learning techniques based on the provided feedback, the confidence associated with the feedback, and/or other factors. For example, in some embodiments, a user associated with COS 101 may select a different configuration and/or provide feedback regarding the configuration selection after COS 101 selected (e.g., at 406) a configuration based on provided configuration information (e.g., from 404). For example, a user associated with COS 101 may select a different configuration than a configuration selected by COS 101. This user selection may indicate that the user-selected configuration is more suitable than the configuration selected by COS 101 (e.g., the user-selected configuration better matches the provided configuration information). In some embodiments, a user may modify a selected configuration (e.g., a user may switch, remove, replace, and/or otherwise modify nodes and/or containers in a configuration). Such a modification may indicate that the modified configuration is more suitable than the unmodified configuration selected by COS 101. Modified and/or user-selected configurations may be configured onto nodes (e.g., as described above, in regard to 410). In such embodiments, where a user modifies and/or selects a different configuration, COS 101 may store information regarding the configuration selection to provide user-reinforced feedback regarding the selection. User-reinforced feedback may be used to enhance future configuration selection with a high level of confidence. Different levels of confidence may indicate, for example, the degree to which a predictive model is modified. Feedback with a relatively high degree of confidence, for example, may impact a predictive model more heavily than feedback with relatively a low degree of confidence.

In some embodiments, a user may provide feedback affirming the selection of a particular configuration. The feedback may include explicit affirmative feedback, such as an affirmative answer when prompted whether the selection was accurate or satisfactory. In some embodiments, the feedback may include one or more actions based on which feedback may be inferred, such as proceeding to use and/or not change the selected configuration within a threshold period of time (e.g., indicating that the user was satisfied with the selection and therefore did no change the configuration). When receiving feedback affirming the selection of a particular configuration, COS 101 may strengthen predictive models associated with that selection. In other words, given the same and/or similar configuration information, COS 101 would be more likely to choose the same configuration. If a user provides a selection rejecting the selection made by COS 101 (e.g., an explicit indication that the selection was not satisfactory, such as a response to a prompt asking if the selection was satisfactory or accurate, or an action based on which feedback may be inferred, such as modifying the selection within a threshold period of time), COS 101 may be less likely to choose a configuration given the same and/or similar configuration information.

Figure 5:
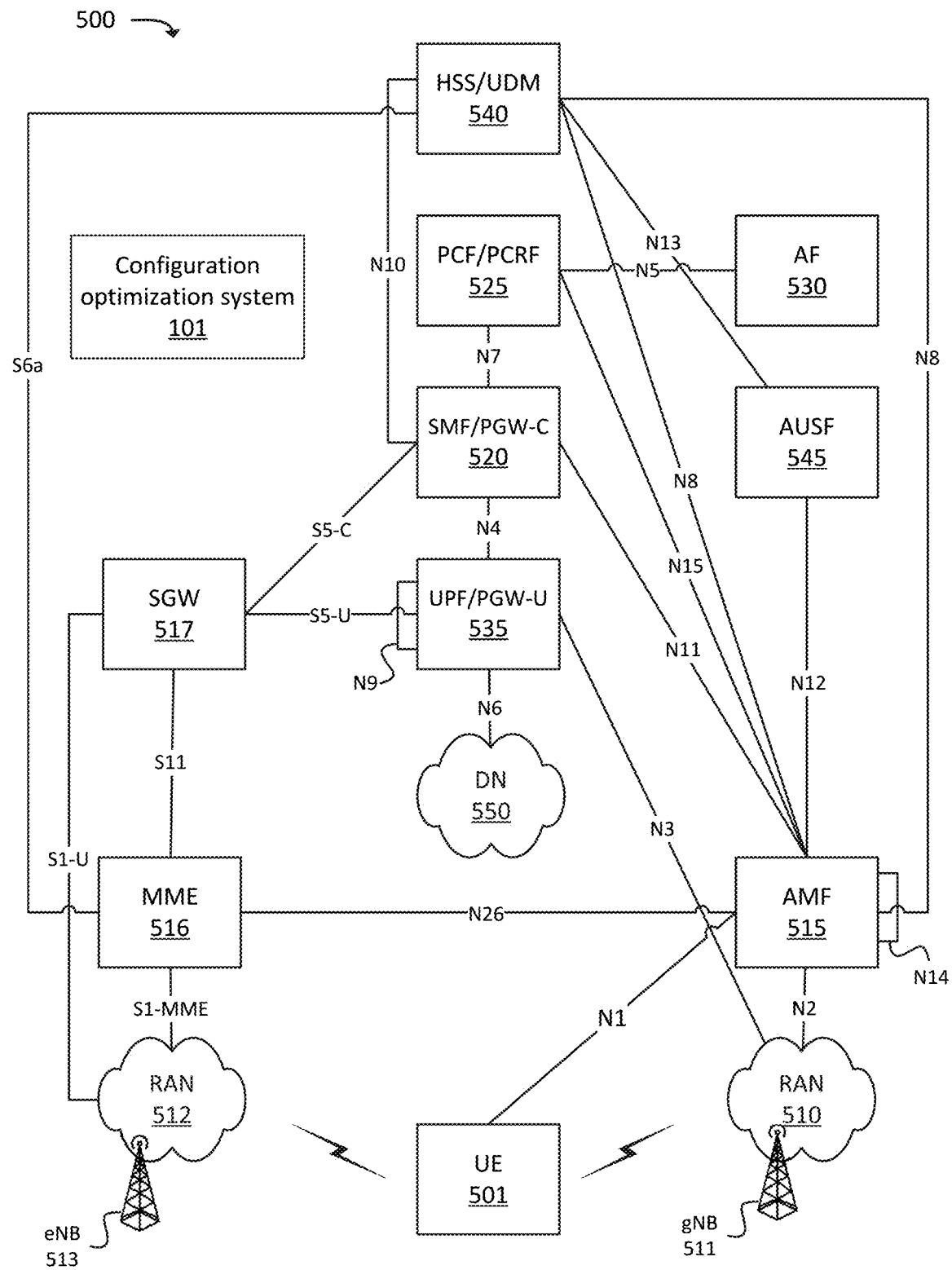
FIG. 5 illustrates an example environment in which one or more embodiments, described herein, may be implemented.

FIG. 5 illustrates an example environment 500, in which one or more embodiments may be implemented. In some embodiments, environment 500 may correspond to a Fifth Generation ("5G") network, and/or may include elements of a 5G network. In some embodiments, environment 500 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 500 may include UE 501, radio access network ("RAN") 510 (which may include one or more Next Generation Node Bs ("gNBs") 511), RAN 512 (which may include one or more one or more evolved Node Bs ("eNBs") 513), AMF 515, SMF/PGW-Control plane function ("PGW-C") 520, PCF/Policy Charging and Rules Function ("PCRF") 525, AF 530, UPF/PGW-User plane function ("PGW-U") 535, HSS/UDM 540, AUSF 545, Data Network ("DN") 550, and COS 101.

The quantity of devices and/or networks, illustrated in FIG. 5, is provided for explanatory purposes only. In practice, environment 500 may include additional devices and/or networks, fewer devices and/or networks, different devices and/or networks, or differently arranged devices and/or networks than illustrated in FIG. 5. For example, while not shown, environment 500 may include devices that facilitate or enable communication between various components shown in environment 500, such as routers, modems, gateways, switches, hubs, etc. Alternatively, or additionally, one or more of the devices of environment 500 may perform one or more functions described as being performed by another one or more of the devices of environment 500. Devices of environment 500 may interconnect with each other and/or other devices via wired connections, wireless connections, or a combination of wired and wireless connections. In some implementations, one or more devices of environment 500 may be physically integrated in, and/or may be physically attached to, one or more other devices of environment 500.

UE 501 may include a computation and communication device, such as a wireless mobile communication device that is capable of communicating with RAN 510 and/or DN 550. UE 501 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 501 may send traffic to and/or receive traffic (e.g., user plane traffic) from DN 550 via RAN 510 and UPF/PGW-U 535.

RAN 510 may be, or may include, a 5G RAN that includes one or more base stations (e.g., one or more gNBs 511), via which UE 501 may communicate with one or more other elements of environment 500. UE 501 may communicate with RAN 510 via an air interface (e.g., as provided by gNB 511). For instance, RAN 510 may receive traffic (e.g., voice call traffic, data traffic, messaging traffic, signaling traffic, etc.) from UE 501 via the air interface, and may communicate the traffic to UPF/PGW-U 535, and/or one or more other devices or networks. Similarly, RAN 510 may receive traffic intended for UE 501 (e.g., from UPF/PGW-U 535, AMF 515, and/or one or more other devices or networks) and may communicate the traffic to UE 501 via the air interface.

RAN 512 may be, or may include, an LTE RAN that includes one or more base stations (e.g., one or more eNBs 513), via which UE 501 may communicate with one or more other elements of environment 500. UE 501 may communicate with RAN 512 via an air interface (e.g., as provided by eNB 513). For instance, RAN 510 may receive traffic (e.g., voice call traffic, data traffic, messaging traffic, signaling traffic, etc.) from UE 501 via the air interface, and may communicate the traffic to UPF/PGW-U 535, and/or one or more other devices or networks. Similarly, RAN 510 may receive traffic intended for UE 501 (e.g., from UPF/PGW-U 535, SGW 517, and/or one or more other devices or networks) and may communicate the traffic to UE 501 via the air interface.

AMF 515 may include one or more devices, systems, Virtualized Network Functions ("VNFs"), etc., that perform operations to register UE 501 with the 5G network, to establish bearer channels associated with a session with UE 501, to hand off UE 501 from the 5G network to another network, to hand off UE 501 from the other network to the 5G network, and/or to perform other operations. In some embodiments, the 5G network may include multiple AMFs 515, which communicate with each other via the N14 interface (denoted in FIG. 5 by the line marked "N14" originating and terminating at AMF 515).

SGW 517 may include one or more devices, systems, VNFs, etc., that aggregate traffic received from one or more eNBs 513 and send the aggregated traffic to an external network or device via UPF/PGW-U 535. Additionally, SGW 517 may aggregate traffic received from one or more UPF/PGW-Us 535 and may send the aggregated traffic to one or more eNBs 513. SGW 517 may operate as an anchor for the user plane during inter-eNB handovers and as an anchor for mobility between different telecommunication networks or RANs (e.g., RANs 510 and 512).

SMF/PGW-C 520 may include one or more devices, systems, VNFs, etc., that gather, process, store, and/or provide information in a manner described herein. SMF/PGW-C 520 may, for example, facilitate in the establishment of communication sessions on behalf of UE 501. In some embodiments, the establishment of communications sessions may be performed in accordance with one or more policies provided by PCF/PCRF 525.

PCF/PCRF 525 may include one or more devices, systems, VNFs, etc., that aggregate information to and from the 5G network and/or other sources. PCF/PCRF 525 may receive information regarding policies and/or subscriptions from one or more sources, such as subscriber databases and/or from one or more users (such as, for example, an administrator associated with PCF/PCRF 525).

AF 530 may include one or more devices, systems, VNFs, etc., that receive, store, and/or provide information that may be used in determining parameters (e.g., quality of service parameters, charging parameters, or the like) for certain applications.

UPF/PGW-U 535 may include one or more devices, systems, VNFs, etc., that receive, store, and/or provide data (e.g., user plane data). For example, UPF/PGW-U 535 may receive user plane data (e.g., voice call traffic, data traffic, etc.), destined for UE 501, from DN 550, and may forward the user plane data toward UE 501 (e.g., via RAN 510, SMF/PGW-C 520, and/or one or more other devices). In some embodiments, multiple UPFs 535 may be deployed (e.g., in different geographical locations), and the delivery of content to UE 501 may be coordinated via the N9 interface (e.g., as denoted in FIG. 5 by the line marked "N9" originating and terminating at UPF/PGW-U 535). Similarly, UPF/PGW-U 535 may receive traffic from UE 501 (e.g., via RAN 510, SMF/PGW-C 520, and/or one or more other devices), and may forward the traffic toward DN 550. In some embodiments, UPF/PGW-U 535 may communicate (e.g., via the N4 interface) with SMF/PGW-C 520, regarding user plane data processed by UPF/PGW-U 535.

HSS/UDM 540 and AUSF 545 may include one or more devices, systems, VNFs, etc., that manage, update, and/or store, in one or more memory devices associated with AUSF 545 and/or HSS/UDM 540, profile information associated with a subscriber. AUSF 545 and/or HSS/UDM 540 may perform authentication, authorization, and/or accounting operations associated with the subscriber and/or a communication session with UE 501.

DN 550 may include one or more wired and/or wireless networks. For example, DN 550 may include an Internet Protocol ("IP")-based PDN, a wide area network ("WAN") such as the Internet, a private enterprise network, and/or one or more other networks. UE 501 may communicate, through DN 550, with data servers, other UEs 501, and/or to other servers or applications that are coupled to DN 550. DN 550 may be connected to one or more other networks, such as a public switched telephone network ("PSTN"), a public land mobile network ("PLMN"), and/or another network. DN 550 may be connected to one or more devices, such as content providers, applications, web servers, and/or other devices, with which UE 501 may communicate.

COS 101 may include one or more devices or systems that perform one or more operations described herein. For example, COS 101 may communicate with one or more of the devices, systems, VNFs, or networks shown in FIG. 5, may generate configurations (e.g., using machine learning and/or other techniques), and may configure, install, instantiate, etc. nodes and/or containers in accordance with a selected configuration. As mentioned above, COS 101 may include, or may be communicatively coupled to, an orchestration system that is capable of receiving information (e.g., diagnostic or monitoring information) from the devices or systems shown in FIG. 5, and is capable of installing or instantiating containers on nodes (e.g., as implemented by physical or virtual hardware). While no explicit connections are shown between COS 101 and other devices or systems of environment 500, COS 101 may, in some embodiments, be communicatively coupled to some or all of the devices or systems of environment 500. In some embodiments, the same devices, nodes, clusters, etc., that implement one or more of the devices or systems of environment 500 may implement some or all of the functionality of COS 101.

Figure 6:
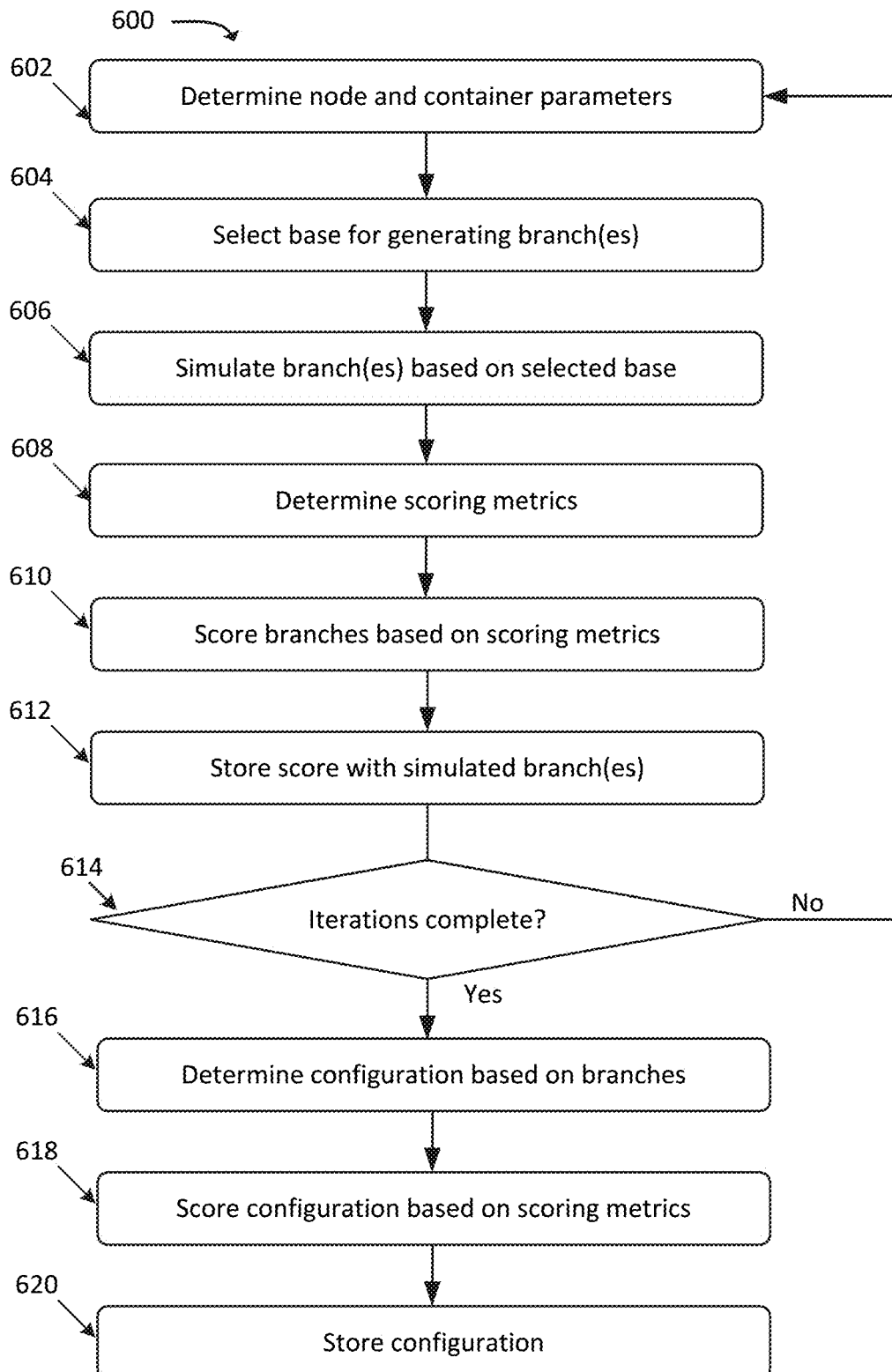
FIG. 6 illustrates an example process for generating one or more configurations, in accordance with some embodiments.

FIG. 6 illustrates an example process 600 for generating configurations, in accordance with some embodiments. In some embodiments, some or all of process 600 may be performed by COS 101. In some embodiments, one or more other devices may perform some or all of process 600 (e.g., in concert with, and/or in lieu of, COS 101).

As shown, process 600 may include determining (at 602) container and node parameters for configuration generation. As described above, such parameters may include information regarding the nodes and/or containers, such as resources associated with containers and/or nodes and/or other information. As described above, container and node parameters may be based on current applications in use and/or may be generated based on predicted future use. In some embodiments, configuration parameters may be generated (e.g., using random resource information, based on predicted usage, etc.) for configuration creation.

Process 600 may further include selecting (at 604) a root to generate one or more branches. As described above, a branch may serve as a root to generate one or more additional branches. In some embodiments, an empty node may serve as a root for branch generation. As described above, a root may be selected based on a branch score (e.g., the highest scoring branch) and/or other criteria. In some embodiments, a node may be selected based on a node order and/or other criteria.

Process 600 may further include simulating (at 606) branches based on the selected base branch. As described above, simulating branches may include generating one or more branches by placing one or more containers into the selected base branch.

Process 600 may also include determining (at 608) scoring metrics associated with the generated (or simulated) branches. Scoring metrics may include criteria by which to score the branches. As described above, for example, a branch may be scored (e.g., to generate a branch score) based on the number of resources utilized (e.g., resources remaining and/or used, etc.), and/or other scoring factors.

Process 600 may also include scoring (at 610) branches. Scoring may occur based on determined scoring metrics (e.g., from 608). Scoring may occur, for example based on a numerical rating, a classification rating (e.g., grade A, grade B, etc.), and/or other ratings. COS 101 may, in some embodiments, generate multiple branch scores for each branch, where each branch score is based on different scoring metrics. The different branch scores, according to the different scoring metrics, may be used in the selection of a particular branch to provide in response to a request that specifies one or more parameters to be prioritized. For example, a request that specifies optimization of processor resources may cause COS 101 to identify a particular branch that has a highest branch score that was generated based on processor resources utilized. As discussed above, in some embodiments, one or more branch scores associated with a branch may be modified based on utilization to generate branches (e.g., branch scores may be decreased when traversed).

Process 600 may further include storing (at 612) the branch with related branch scores. In some embodiments, the configuration may be stored with the related branch score, in a repository (e.g., configuration repository 303) and/or some other data structure capable of maintaining node information. In some embodiments, the storing may further provide details regarding the configuration information utilized to simulate the branch. In some embodiments, storing the branch score may include maintaining one or more branch scores associated with a previously generated branch.

Process 600 may further include a determination (at 614) whether the iterations are complete. The iterations may be complete, for example, based on received configuration information such as parameters limiting the simulation to a number of iterations, a specific time in which to complete iterations (e.g., a time limit), etc. If the determination indicates that the iterations are not complete, COS 101 may repeat 602-614 to generate one or more iterations of branches before selecting branches to form a configuration.

As shown, if the determination (at 614) is that the iterations are complete, COS 101 may determine (at 616) a configuration based on simulated branches. As described above, COS 101 may select the highest scoring branches associated with each node to generate a configuration.

Process 600 may further include scoring (at 618) a configuration based on scoring metrics. Scoring may occur based on various criteria. In some embodiments, a configuration score may be generated for the configuration in accordance with the determined scoring metrics (e.g., based on the same scoring metrics used to score branches, from 608). COS 101 may, in some embodiments, generate multiple configuration scores for each configuration, where each configuration score is based on different scoring metrics. The different configuration scores, according to the different scoring metrics, may be used in the selection of a particular configuration to provide in response to a request that specifies one or more parameters to be prioritized. For example, a request that specifies optimization of processor resources may cause COS 101 to identify a particular configuration based on the configuration scores (e.g., a configuration that has a highest configuration score) that were generated based on processor resources utilized.

Process 600 may further include storing (at 620) a configuration with the related configuration score. In some embodiments, the configuration may be stored with related configuration score(s) in a repository (e.g., configuration repository 303) and/or some other data structure capable of maintaining configuration information. In some embodiments, the provision may further provide details regarding the configuration information utilized to create the configuration.

Once information regarding a configuration is stored, portions of process 600 (e.g., some or all of blocks 602-620) may iteratively repeat in order to generate one or more configurations, which may use the same or different parameters (e.g., as received at 602). In some embodiments, configuration information may limit the number of configurations to generate based on a configuration limitation (e.g., limit the number of configurations to generate), timing (e.g., generate for a limited time period), and/or other restrictions.

Figure 7:
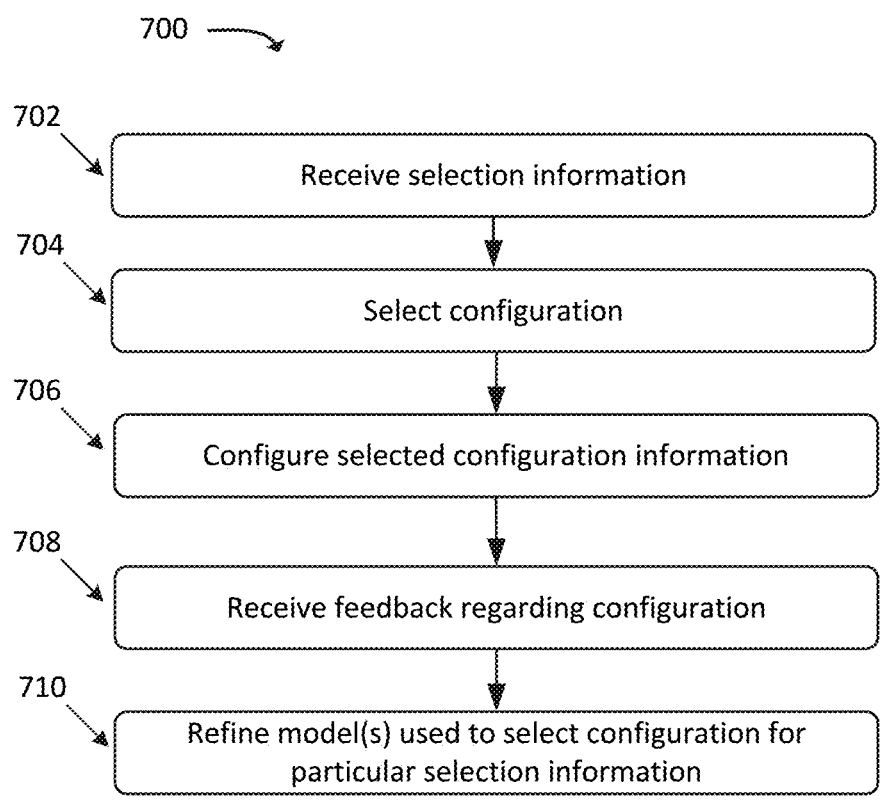
FIG. 7 illustrates an example process for selecting and configuring a configuration, in accordance with some embodiments.

FIG. 7 illustrates an example process of selecting and configuring a configuration in response to a request for a configuration. Process 700 may generally correspond, for example, to a situation in which a set of containers are to be placed into a set of nodes. For example, a user may desire to place the set of containers onto a predetermined set of nodes, and/or onto an optimal set of nodes as indicated by a particular configuration that has been generated by COS 101. In some embodiments, some or all of process 700 may be performed by COS 101. In some embodiments, one or more other devices may perform some or all of process 700 (e.g., in concert with, and/or in lieu of, COS 101).

Process 700 may include receiving (at 702) selection information. As described above, selection information may include container and/or node information. In some embodiments, selection information may include additional criteria (e.g., optimize a particular resource, optimize number of nodes, etc.).

Process 700 may additionally include selecting (at 704) a configuration. As described above, COS 101 may receive a set of configurations (e.g., from configuration repository 303) and one or more configuration scores associated with each configuration of the set of configurations. As described above, a configuration may be chosen based on an associated configuration score. For example, a configuration may be selected because the configuration has the highest configuration score for the selection parameters (e.g., received at 702). In some embodiments, a similarity analysis may be performed between the selection information (received at 702) and the one or more configurations stored in configuration repository 303, in order to identify a particular configuration that has a highest degree of similarity to the selection information. As discussed above, one or more machine learning techniques may have been used to correlate attributes of selection information to attributes of one or more configurations.

Process 700 may also include configuring (at 706) a node in accordance with the selected configuration. As described above, COS 101 may configure (e.g., install, instantiate, etc.) and/or may provide instructions to another device to configure nodes and/or containers.

Process 700 may include receiving (at 708) feedback regarding the configuration. As discussed above, feedback may enhance future configuration selection based on previous use (e.g., utilizing machine learning techniques). In some embodiments, explicit feedback may be received from a user (e.g., providing relatively high degree of confidence, as discussed above). In some embodiments, feedback may be inferred by the absence of explicit feedback from a user (e.g., providing relatively low degree of confidence, as discussed above).

Process 700 may further include refining (at 710) one or more models that were used to select the particular configuration for the selection information. For example, based on the feedback, COS 101 may determine whether the selection (at 704) of the particular configuration was accurate or otherwise appropriate for the selection information (received at 702). COS 101 may refine the association or correlation of some or all of the selection information to the particular configuration that was selected, based on the feedback (received at 708).

Figure 8:
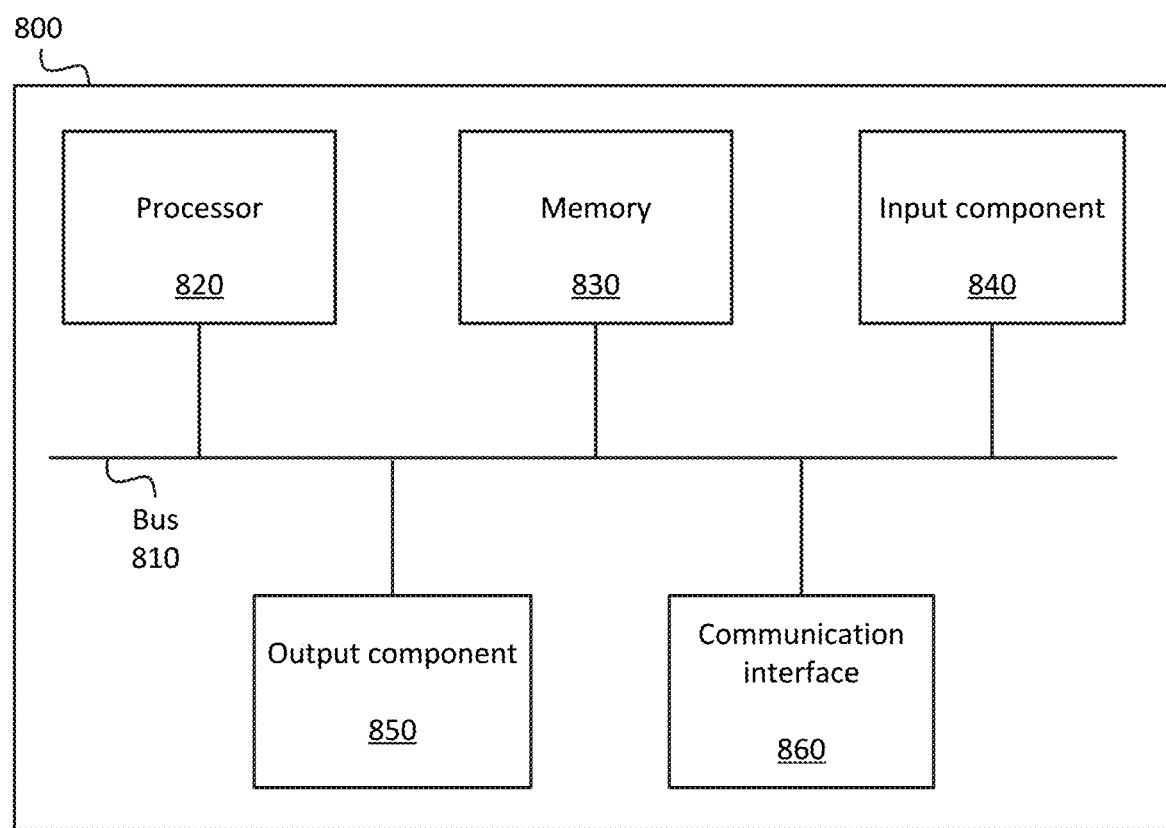
FIG. 8 illustrates example functional components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A-1H, 2A-2D, 4, 6, and 7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive information indicating a set of resources associated with a first node in a virtualized environment;
receive information regarding a first set of containers to place in the first node, the information for each container indicating a set of resources utilized by the each container;
generate a plurality of candidate configurations based on performing a plurality of iterations of simulating placement of the first set of containers in the first node, wherein generating a particular candidate configuration based on performing a particular iteration of placing the first set of containers in the first node includes:
generating a first set of candidate branches, wherein generating the first set of candidate branches includes:
generating a first branch that simulates placement of a first container, of the first set of containers, in the first node,
generating a first score, for the first branch, based on utilization, by the first container, of the set of resources associated with the first node,
generating a second branch that simulates placement of a second container, of the first set of containers, in the first node, the second branch including the second container in lieu of the first container, and
generating a second score, for the second branch, based on utilization, by the second container, of the set of resources associated with the first node,
comparing the first score and the second score,
selecting, based on the comparing, the first branch from the first set of candidate branches,
generating a second set of candidate branches based on the selected first branch,
selecting a particular branch from the second set of candidate branches,
generating, based on the selected particular branch, the particular candidate configuration, and
generating a configuration score for the particular candidate configuration based on utilization of the set of resources of the first node by each container associated with the particular candidate configuration;
receive a request to place a second set of containers in a second node;
select a particular configuration, from the plurality of candidate configurations, based on configuration scores associated with the plurality of candidate configurations and based on a comparison of attributes of the second set of containers to attributes of the first set of containers; and
place the second set of containers in the second node based on the selected particular configuration.

2. The device of claim 1, wherein generating the second set of candidate branches further includes:
generating a third branch that simulates placement of a third container, of the first set of containers, in the first node, the third branch including the first and third containers;
generating a third score, for the third branch, based on utilization, by the first and third containers, of the set of resources associated with the first node;
generating a fourth branch that simulates placement of a fourth container, of the first set of containers, in the first node, the fourth branch including the fourth container in lieu of the third container; and
generating a fourth score, for the fourth branch, based on utilization, by the first and fourth containers, of the set of resources associated with the first node,
wherein selecting a particular branch from the second set of candidate branch includes:
comparing the third score to the fourth score,
determining that the third score is greater than the fourth score, and
selecting the third candidate branch as the selected particular branch based on determining that the third score is greater than the fourth score.

3. The device of claim 1, wherein generating the first set of candidate branches further includes:
identifying an affinity relationship between the first container and a third container, of the first set of containers, wherein the affinity relationship requires the first container and the third container to be placed in a same node; and
simulating placement of the first container and the third container in the first node based on identifying the affinity relationship between the first container and the third container, wherein the generated particular candidate configuration includes the first and third containers placed in the first node.

4. The device of claim 1, wherein generating the second set of candidate branches further includes:
identifying an anti-affinity relationship between the first container and a third container, of the first set of containers, wherein the anti-affinity relationship requires the first container and the third container to be placed in different nodes; and
forgoing the placement of the third container in the first node based on the anti-affinity relationship with the first container.

5. The device of claim 4, wherein generating the particular configuration further includes:
simulating, based on the anti-affinity relationship between the first and third containers, the placement of the third container in a second node, the second node including the third container in lieu of the first container, wherein the second node is different than the first node, and wherein the particular configuration includes the first and second nodes.

6. The device of claim 1, wherein generating the second set of candidate branches further includes:
    modifying the first score associated with the first branch based on one or more of:
        a quantity of iterations of branches generated based on the first branch, or
        an average configuration score of a plurality of configurations that have been generated based on the first branch.

7. The device of claim 1, wherein the configuration score for the particular candidate configuration is a first configuration score that is based on utilization of a first type of resource associated with the first node in accordance with the particular candidate configuration,
    wherein the one or more processors are further configured to generate a second configuration score for the particular candidate configuration based on utilization of a second type of resource associated with the first node in accordance with the particular candidate configuration, and
    wherein the request specifies an indication to prioritize the first type of resource, wherein the particular configuration is selected from the plurality of candidate configurations based on the first configuration score associated with the particular configuration.

8. A non-transitory computer-readable medium, storing a plurality of processor-executable instructions to:
    receive information indicating a set of resources associated with a first node in a virtualized environment;
    receive information regarding a first set of containers to place in the first node, the information for each container indicating a set of resources utilized by the each container;
    generate a plurality of candidate configurations based on performing a plurality of iterations of simulating placement of the first set of containers in the first node, wherein generating a particular candidate configuration based on performing a particular iteration of placing the first set of containers in the first node includes:
        generating a first set of candidate branches, wherein generating the first set of candidate branches includes:
            generating a first branch that simulates placement of a first container, of the first set of containers, in the first node,
            generating a first score, for the first branch, based on utilization, by the first container, of the set of resources associated with the first node,
            generating a second branch that simulates placement of a second container, of the first set of containers, in the first node, the second branch including the second container in lieu of the first container, and
            generating a second score, for the second branch, based on utilization, by the second container, of the set of resources associated with the first node,
            comparing the first score and the second score,
        selecting, based on the comparing, the first branch from the first set of candidate branches,
        generating a second set of candidate branches based on the selected first branch;
        selecting a particular candidate branch from the second set of candidate branches;
        generating, based on the selected particular candidate branch, the particular candidate configuration, and
        generating a configuration score for the particular candidate configuration based on utilization of the set of resources of the first node by each container associated with the particular candidate configuration;
    receive a request to place a second set of containers in a second node;
    select a particular configuration, from the plurality of candidate configurations, based on configuration scores associated with the plurality of candidate configurations and based on a comparison of attributes of the second set of containers to attributes of the first set of containers; and
    place the second set of containers in the second node based on the selected particular configuration.

9. The non-transitory computer-readable medium of claim 8, wherein generating the second set of candidate branches further includes:
    generating a third branch that simulates placement of a third container, of the first set of containers, in the first node, the third branch including the first and third containers;
    generating a third score, for the third branch, based on utilization, by the first and third containers, of the set of resources associated with the first node;
    generating a fourth branch that simulates placement of a fourth container, of the first set of containers, in the first node, the fourth branch including the fourth container in lieu of the third container; and
    generating a fourth score, for the fourth branch, based on utilization, by the first and fourth containers, of the set of resources associated with the first node,
    wherein selecting a particular branch from the second set of candidate branch includes:
        comparing the third score to the fourth score,
        determining that the third score is greater than the fourth score, and
    selecting the third candidate branch as the selected particular branch based on determining that the third score is greater than the fourth score.

10. The non-transitory computer-readable medium of claim 8, wherein generating the first set of candidate branches further includes:
    identifying an affinity relationship between the first container and a third container, of the first set of containers, wherein the affinity relationship requires the first container and the third container to be placed in a same node; and
    simulating placement of the first container and the third container in the first node based on identifying the affinity relationship between the first container and the third container, wherein the generated particular candidate configuration includes the first and third containers placed in the first node.

11. The non-transitory computer-readable medium of claim 8, wherein generating the second set of candidate branches further includes:
    identifying an anti-affinity relationship between the first container and a third container, of the first set of containers, wherein the anti-affinity relationship requires the first container and the third container to be placed in different nodes; and
    forgoing the placement of the third container in the first node based on the anti-affinity relationship with the first container.

12. The non-transitory computer-readable medium of claim 11, wherein generating the particular configuration further includes:
simulating, based on the anti-affinity relationship between the first and third containers, the placement of the third container in a third node, the third node including the third container in lieu of the first container,
wherein the third node is different than the first node, and
wherein the particular configuration includes the first and third nodes.

13. The non-transitory computer-readable medium of claim 8, wherein generating the second set of candidate branches further includes:
modifying the first score associated with the first branch based on one or more of:
a quantity of iterations of branches generated based on the first branch, or
an average configuration score of a plurality of configurations that have been generated based on the first branch.

14. The non-transitory computer-readable medium of claim 8, wherein the configuration score for the particular candidate configuration is a first configuration score that is based on utilization of a first type of resource associated with the first node in accordance with the particular candidate configuration,
wherein the plurality of processor-executable instructions further include processor-executable instructions to generate a second configuration score for the particular candidate configuration based on utilization of a second type of resource associated with the first node in accordance with the particular candidate configuration,
wherein the request specifies an indication to prioritize the first type of resource, wherein the particular configuration is selected from the plurality of candidate configurations based on the first configuration score associated with the particular configuration.

15. A method, comprising:
receiving information indicating a set of resources associated with a first node in a virtualized environment;
receiving information regarding a first set of containers to place in the first node, the information for each container indicating a set of resources utilized by the each container;
generating a plurality of candidate configurations based on performing a plurality of iterations of simulating placement of the first set of containers in the first node, wherein generating a particular candidate configuration based on performing a particular iteration of placing the first set of containers in the first node includes:
generating a first set of candidate branches, wherein generating the first set of candidate branches includes:
generating a first branch that simulates placement of a first container, of the first set of containers, in the first node,
generating a first score, for the first branch, based on utilization, by the first container, of the set of resources associated with the first node,
generating a second branch that simulates placement of a second container, of the first set of containers, in the first node, the second branch including the second container in lieu of the first container, and
generating a second score, for the second branch, based on utilization, by the second container, of the set of resources associated with the first node,
comparing the first score and the second score,
selecting, based on the comparing, the first branch from the first set of candidate branches,
generating a second set of candidate branches based on the selected first branch,
selecting, a particular branch from the second set of candidate branches,
generating, based on the selected particular branch, the particular candidate configuration, and
generating a configuration score for the particular candidate configuration based on utilization of the set of resources of the first node by the each container associated with the particular candidate configuration;
receive a request to place a second set of containers in a second node;
select a particular configuration, from the plurality of candidate configurations, based on configuration scores associated with the plurality of candidate configurations and based on a comparison of attributes of the second set of containers to attributes of the first set of containers; and
placing the second set of containers in the second node based on the selected particular configuration.

16. The method of claim 15, wherein generating the second set of candidate branches further includes:
generating a third branch that simulates placement of a third container, of the first set of containers, in the first node, the third branch including the first and third containers;
generating a third score, for the third branch, based on utilization, by the first and third containers, of the set of resources associated with the first node;
generating a fourth branch that simulates placement of a fourth container, of the first set of containers, in the first node, the fourth branch including the fourth container in lieu of the third container; and
generating a fourth score, for the fourth branch, based on utilization, by the first and fourth containers, of the set of resources associated with the first node,
wherein selecting a particular branch from the second set of candidate branch includes:
comparing the third score to the fourth score,
determining that the third score is greater than the fourth score, and
selecting the third candidate branch as the selected particular branch based on determining that the third score is greater than the fourth score.

17. The method of claim 15, wherein generating the first set of candidate branches further includes:
identifying an affinity relationship between the first container and a third container, of the first set of containers, wherein the affinity relationship requires the first container and the third container to be placed in a same node; and
simulating placement of the first container and the third container in the first node based on identifying the affinity relationship between the first container and the third container, wherein the generated particular candidate configuration includes the first and third containers placed in the first node.

18. The method of claim 15, wherein generating the second set of candidate branches further includes:
identifying an anti-affinity relationship between the first container and a third container, of the first set of containers, wherein the anti-affinity relationship requires the first container and the third container to be placed in different nodes; and forgoing the placement of the third container in the first node based on the anti-affinity relationship with the first container.

19. The method of claim 18, wherein generating the particular configuration further includes:

simulating, based on the anti-affinity relationship between the first and third containers, the placement of the third container in a third node, the third node including the third container in lieu of the first container, wherein the third node is different than the first node, and wherein the particular configuration includes the first and third nodes.

20. The method of claim 15, wherein generating the second set of candidate branches further includes:

modifying the first score associated with the first branch based on one or more of:

a quantity of iterations of branches generated based on the first branch, or an average configuration score of a plurality of configurations that have been generated based on the first branch.

* * * * *